United States Patent
Barclay et al.

(10) Patent No.: US 6,311,072 B1
(45) Date of Patent: Oct. 30, 2001

(54) METHODS AND APPARATUS FOR TRANSLATING BETWEEN TELEPHONE SIGNALING PROTOCOLS

(75) Inventors: Deborah L. Barclay, Winfield; Michael F. Dolan, Bolingbrook; Joe Thomas Hall, Winfield; Laurel A. Salvador, Wheaton; Robert S. Sellinger, Naperville; James J. Sowa, Naperville; Kenneth Wayne Strom, Naperville, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/109,221

(22) Filed: Jun. 30, 1998

(51) Int. Cl.⁷ ........................................ H04Q 7/20
(52) U.S. Cl. .................... 455/552; 455/557; 370/466; 370/467
(58) Field of Search ............................ 379/88.08, 88.12, 379/88.14, 113, 115, 207, 220, 230, 229; 455/426, 428, 432, 433, 445, 454, 459, 461, 22, 511, 74, 74.1, 552, 553, 556, 557, 560, 131, 142, 143; 370/466, 467, 401, 338, 524, 340

(56) References Cited

U.S. PATENT DOCUMENTS

H1837 * 2/2000 Fletcher et al. .
5,182,748 * 1/1993 Sakata et al. ........................ 370/466
5,327,544   7/1994 Lee et al. .
5,386,467 * 1/1995 Ahmad ................................ 379/220
5,610,974   3/1997 Lantto .
5,640,386 * 6/1997 Wiedeman ........................... 370/320
5,640,446 * 6/1997 Everett et al. ...................... 379/115
5,717,737 * 2/1998 Doviak et al. ...................... 455/403
5,726,640 * 3/1998 Jones et al. ..................... 340/825.22
5,778,189 * 7/1998 Kimura et al. .................. 395/200.66
5,854,982 * 12/1998 Chambers et al. .................. 455/445
5,870,454 * 2/1999 Dahlen .............................. 379/88.14
5,884,262 * 3/1999 Wise et al. .......................... 704/270
5,894,478 * 4/1999 Barzegar et al. .................... 370/401
5,924,030 * 7/1999 Rautiola et al. ..................... 455/426
5,933,784 * 8/1999 Gallabher et al. ................... 455/552
5,943,616 * 8/2000 Andersson .......................... 455/422
5,956,331 * 9/1999 Rautiola ............................. 370/338
5,991,375 * 11/1999 Stahl et al. ......................... 379/113
6,002,931 * 12/1999 Yamaguchi et al. ................ 455/433
6,111,893 * 8/2000 Volftsun ............................. 370/466
6,151,332 * 11/2000 Gorsuch et al. ..................... 370/466

* cited by examiner

Primary Examiner—Nay Maung
Assistant Examiner—Jean A Gelin

(57) ABSTRACT

Coupling together two or more communication systems that use different signaling protocols requires a protocol converter. A protocol converter is provided that includes interfaces to communications systems to be coupled together mimics the operation of the communications systems each interface is coupled to providing a seamless coupling between the systems.

2 Claims, 25 Drawing Sheets

| Message from MSC | MSC Timers | Message from BS(CC) | BS(CC) Timers |
|---|---|---|---|
| 302 Paging Request | | | |
| | +T3113+ 304 | | |
| | | 303 Complete L3 Info + Paging Response | |
| | −T3113− | | +T3230+ 523<br>+T303+ 524 |
| 305 SCCP Connection Confirmed | | | |
| 307 Setup | | | |
| | +T307+ 515 | | −T3230− |
| | | 309 Call confirmed | |
| | −T307− | | |
| 311 Assignment Request | | | |
| | +T10+ 510 | | −T303− |
| | | 313 Assignment Complete | |
| | −T10−;<br>+T301+ 521 | | |
| | | 315 Connect | |
| | −T301− | | +T313+ 525 |
| 317 Connect Ack | | | |
| | | | −T313 |

| Message from MSC | MSC Timers | Message from Base Station | Base Station Timers |
|---|---|---|---|
| 403 MGPAGE_C | | | |
| | +CPPRT+ 503 | | |
| | | 405 MGPGRSP_C | |
| | −CPRT− | | +DEWTCSETUP2+ 513 |
| 407 MGTCSETUP_C | | | |
| | | | −DEWTCSETUP2−; +DEWASGN2+ 517 |
| 411 MGSHASGN_C | | | |
| | +CPTCCONF+ 509 | | −DEWASGN2− |
| | | 413 MGTCCONF_C | |
| | −CPTCCONF−; +CPCSAT+ 511 | | |
| | | 415 MGANSWER | |
| | −CPCSAT− | | |

FIG. 5

| | | | | |
|---|---|---|---|---|
| \multicolumn{5}{|c|}{MOBILE TERMINATION 501} |

| # | MSC 107 | > | Translator 213 | > | BS(CC) 205 |
|---|---|---|---|---|---|
| a | MGPAGE_C 403 | > | | | |
| b | +CPPRT+ 503 | | | | |
| c | | | PAGING REQUEST 302 | > | |
| d | | | +T3113+ 304 | | |
| | | | | < | COMPLETE_L3_INFO+PAGING RESPONSE 303 |
| | | | -T3113- | | |
| f | | | | | +T3230+ 523 +T303+ 524 |
| f1 | | | SCCP_Connection_Conf 305 | > | |
| g | | < | MGPGRSP_C 405 | | |
| h | | | +DEWTCSETUP2+ 513 | | |
| i | -CPPRT- | | | | |
| j | MGTCSETUP_C 407 | > | | | |
| l | | | -DEWTCSETUP2- | | |
| m | | | SETUP 307 | > | |
| n | | | +T307+ 515 | | -T3230 |
| p | | | | < | CALL_CONFIRMED 309 |
| q | | | -T307- | | |
| r | | | +DEWASGN2+ 517 | | |
| s | MGSHASGN_C 411 | > | | | |
| s1 | | | -DEWASGN2- | | |
| t | +CPTCCONF+ 509 | | | | |
| u | | | ASSIGNMENT REQUEST 311 | > | |
| v | | | +T10+ 519 | | -T303- |
| w | | | | < | ASSIGNMENT_COMPLETE |
| x | | | -T10- | | |
| y | | < | MGTCCONF_C 413 | | |
| z | -CPTCCONF- | | +T301+ 521 | | |
| z1 | +CPCSAT+ 511 | | | | |
| bb | | | | < | CONNECT 315 |
| cc | | | -T301- | | +T313+ 525 |
| ee | | < | MGANSWER 415 | | |
| ee1 | -CPCSAT- | | | | |
| ff | | | CONNECT ACK 317 | > | |
| gg | | | | | -T313- |

FIG. 7

| MOBILE ORIGINATION 701 | | | | | |
|---|---|---|---|---|---|
| # | MSC 107 | 715 | Translator 213 | 717 | BS(CC) 205 |
| a | | | | < | COMPLETE_L3 INFO |
| b | | | | | +CM_SVC_REQ 701 |
| c | | | | | +T3230+ 523 +T303+ 524 |
| d | | | SCCP_Connection_Conf 305 | > | |
| d1 | | | +T302+ 704 | | −T3230−f |
| g | | | | < | SETUP 703 |
| h | | | −T302− | | |
| i | | < | MGORIG_C 705 | | |
| j | | | +DEWTCSETUP1+ 706 | | |
| k | MGTCSETUP_C 407 | > | | | |
| l | | | −DEWTCSETUP1− | | |
| l1 | | | +DEWASGN1+ 708 | | |
| m | | | Call_Proceeding 707 | > | |
| s | MGSHASGN_C 411 | > | | | |
| s1 | +CPTCCONF+ 509 | | −DEWASGN2− | | |
| v | | | Assign_Req(DS0/DS1) 311 | > | |
| v1 | | | +T10+ 709 | | −T303− |
| x | | | | < | Assignment_complete 313 |
| y | | < | MGTCCONF_C 413 | | |
| y1 | −CPTCCONF− | | −T10− | | |

1613 (411)

FIG. 25
1117
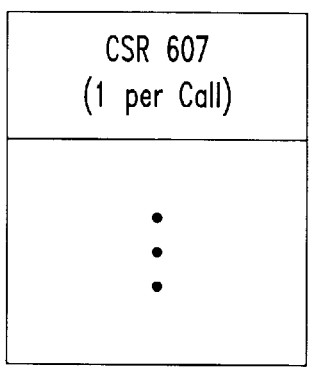
CSRs 609
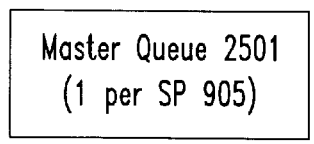
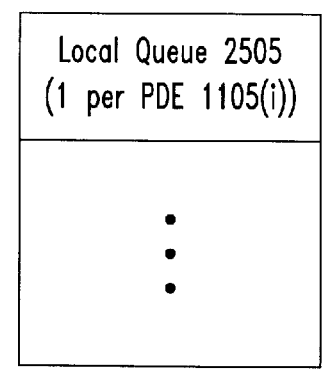
Local Queues 2503

METHODS AND APPARATUS FOR TRANSLATING BETWEEN TELEPHONE SIGNALING PROTOCOLS

FIELD OF THE INVENTION

The invention relates generally to the translation of communications protocols and more specifically to translation of the signaling protocols used in telephone systems. In a particular embodiment, the invention relates to signaling protocols used in wireless telephone systems.

BACKGROUND OF THE INVENTION

Making a telephone call generally involves two kinds of channels for communicating information: a voice channel for carrying representations of audio signals between the telephones (or data signals represented using voice signals between computers) and a signal channel which carries the signaling messages needed to perform operations on the voice channel. Examples of such operations include setting up the voice channel at the beginning of the telephone call, taking it down at the end of the telephone call, providing special services such as call forwarding and 3-way calling, and in the case of mobile telephony, handing off a call as the mobile station moves from one cell to another. In order for the devices in the telephone network that provide and respond to the signaling information to work correctly, the signaling messages must conform to a protocol, that is, an exact description of the form and meaning of each of the signaling messages and of the ways in which the signaling messages may be combined to cause the telephone network to carry out its operations. The voice channel and the signaling channel may employ different physical channels or they may employ the same physical channel, as for example is the case in digital systems, where information is carried in packets and the information in the packet may either be a representation of the audio information or a signaling message.

FIG. 1 shows these channels in the context of a cellular telephony system 101. Only the portion of system 101 relevant to the present discussion is shown in the figure. In FIG. 101, voice channels 105 are represented by solid lines and signaling channels are represented by dashed lines. In system 101, a mobile switching center 107, which is the interface between the wireless system and the wired system, is connected by a number of trunks 106 to other mobile switching centers 107 or standard wired telephone switches. Included in trunks 106 are voice channels and signaling channels. Mobile switching center 107 is further connected by voice channels and signaling channels to a number of base stations. Base stations provide voice and signaling channels 114 for mobile telephone stations. In the system shown in FIG. 1, each base station consists of two parts: a BS(CE) 109 and one or more base stations BS(CE) 111(0 . . . n) that are controlled by the BS(CC) 109. In FIG. 1, only the BS(CE)s belonging to BS(CC) 109(0) are shown. Each BS(CE) 111 is located in a geographical area termed a cell 115. BS(CE)s 111 include radio transmitters and receivers which they use to provide voice channels and signaling channels 114 for mobile telephone stations 113(0 . . . o) that are currently within cell 115. In the system of FIG. 1, BS(CC)s 109(0 . . . m), connect the BS(CE) they control via voice channels and signaling channels to mobile switching center 107. In other configurations, the base stations that include the radio transmitters and receivers may be connected directly to mobile switching center 107. Of course, the mobile telephone station may be any device which communicates by means of mobile telephony protocols.

When a mobile station 113($i$) is the source of a telephone call, it is said to originate the call. Originating mobile station 113($i$) uses the signaling channel of 114 to send a message which informs base station 111($j$) of its need to initiate a telephone call, of its own identity, and of the number of the telephone it wishes to call. Base station 111($j$) passes the request to make a call and the identification via base station controller 109($k$) to mobile switching center 107, which uses the signaling channels between mobile switching center 107 and the switch to which the called telephone is attached to send call set up signaling messages to the latter switch. These messages obtain the voice channels between the switches that are necessary for the call, and each switch sets up the voice channels that are needed between the switch and the telephone.

When a mobile station 113($i$) is the destination of a telephone call, it is said to terminate the call. A data base in mobile telephone system 101 keeps track of the current location of each active mobile station 113 in telephone system 101. The call may come either from another mobile station or from an ordinary telephone. In either case, when it reaches mobile telephone system 101, a MSC 107($r$) queries the data base and determines that terminating mobile station 113($i$) is currently reachable via MSC 107($r$). MSC 107($r$) responds to the call set up message by sending signaling messages via BSC 109($k$) and BS 111($j$) to mobile station 113($i$) as required to terminate the call at mobile station 113($i$). Once the voice channels are set up, the call may proceed. When the call is finished, signaling messages must similarly be exchanged among the component of system 101 to take down the call, that is, to make the voice channels used by the call available for use by other calls.

In system 101, there are protocols for the signaling messages exchanged by different kinds of components. The protocol for the signaling messages defines the interface between the two kinds of components. For example, the interface between a MSC 107 and its base stations 111 is termed the A interface, shown at 108 in FIG. 1. Since there are BSCs 109 in the configuration of system 101, the A interface is between MSC 107 and BSC 109. Different MSCs 107 may have different A interfaces, as may different base stations, but a given MSC 107 will only work with a base station that has the same A interface, that is, that uses the signaling protocol that MSC 107 expects it to use. The same is true with regard to the other interfaces in system 101. The requirement that components that signal each other employ the same signaling protocol severely limits the ability of builders of telephone networks to combine equipment as they wish, and thereby to achieve the best possible cost and performance tradeoffs.

What is needed if components that use different signaling protocols are to be combined at an interface such as interface A in system 101 is techniques for converting sequences of messages belonging to one of the protocols to equivalent sequences of messages belonging to another one of the protocols. Such conversion is well known in the computer arts, where it is used for example in bridges, devices which connect data networks that use different protocols for data packets and translate data packets that conform to the protocol required for one kind of network into data packets that conform to the protocol required for another kind of network.

Unfortunately, the protocol translation techniques developed in the computer arts cannot be applied directly to telephone signaling protocols. The reasons for this include the following:

telephone networks are generally more complex than computer networks;

telephone networks employ separate voice and signaling channels; and voice communications are subject to stringent real-time constraints.

The greater complexity of telephone networks is due first to the fact that a telephone network communicates between telephones, which are comparatively "dumb" devices, while a data network communicates between computers, which are comparatively "smart" devices. Thus, designers of computer networks can keep their communications protocols, and accordingly, their routing and switching devices, very simple, can build complex protocols on top of the communications protocols, and can use the processing power of the computers to deal with the complex protocols. Designers of telephone networks, on the other hand, must build the processing power that is lacking in the telephones into their networks. A modern telephone network can in fact be understood as a very large distributed computer system that is required to be highly fault-tolerant and to operate within stringent real-time constraints. Operation of this very large distributed computer system is coordinated by the signaling protocols, which thus must perform functions that in a data network are performed by separate low-level communications protocols, higher-level messaging protocols, and the operating systems of the computers connected to the network.

As far as is known, where telephone protocols have been translated, it has been done at the level of the switch. For example, J. Lantto, U.S. Pat. No. 5,610,974, Method and arrangement for handling a mobile telephone subscriber administered in different mobile telephone networks with a common call number, issued Mar. 11,97, deals with some of the problems that arise when a mobile station roams from a mobile telephone system that operates according to one kind of standard into a mobile telephone system that operates according to another kind of standard. The problems that are addressed in the patent are those of making information such as the mobile station's telephone number and the kinds of special services that are to be provided to it available across both systems. The approach taken in the patent is to set up a switch and database which is accessible to both systems and which appears to each system to be a switch and data base in that system. In this arrangement, the switch must of course be able to respond correctly to the protocols used in both systems. The "translation" disclosed in Lantto is in fact extremely limited, since what the arrangement actually does is respond to a protocol that sets a value in the data base in one system by setting the value in its data base and respond to a protocol in the other system that reads the value from a data base by reading the value from its data base.

While modern telephone switches have sufficient computational power to do protocol translation, there are good reasons for doing the protocol translation in devices other than switches. One is that the switch is the most expensive device in a telephone system. Protocol translation at A interface 108, for example, is not economical if the solution of Lantto is employed and an additional switch is inserted at A interface 108 in system 101. Another is the complexity of the switches. If MSC 107 in system 101 is implemented using a modem switch such as the 5ESS® central office switch manufactured by Lucent Technologies, the switch can be programmed to deal with more than one A interface 108. There are several problems with doing this. One is that the switch is a complex device, and writing code for it is inherently different. Another is that a switch such as the 5ESS contains between 5 and 7 million lines of code, and any change made anywhere in the code can have effects elsewhere. This not only further increases the difficulty of writing the code, but enormously increases the time and effort involved in testing it. Finally, even the utmost care in writing and testing cannot eliminate all bugs in the code, and a bug in the switch code can result not just in a failure at A interface 108, but a failure of the entire switch.

It is thus an object of the invention disclosed herein to overcome the problems for protocol translation posed by the complexity of telephone signaling protocols and thereby to permit construction of devices and methods that permit translation of signaling protocols in devices other than switches, and which thereby provide a low-cost and convenient way of combining components that employ different signaling protocols in a single telephone system.

SUMMARY OF THE INVENTION

A protocol converter translates message sequences in one protocol for one communication system to substantially equivalent messages in a different protocol used in a second communication system. The protocol converter has two interfaces: one interface is coupled to the first communication system and seamlessly couples the first communication system to the protocol converter. Message sequences received through the first interface are converted to a second protocol by a processor that is programmed to translate message sequences between the two communication systems.

Translated, (i.e. converted) message sequences from the first communication system are coupled into a second communication system using the translated message sequence through a second interface. The second interface couples the protocol converting processor to the second communication system.

Both the first and second communication systems work into the first and second interfaces respectively such that both systems "think" the corresponding interface is a continuation of the communication system.

BRIEF DESCRIPTION OF THE DRAWING

FIG. 3 shows call termination according to the IS-634 protocol;

FIG. 4 shows call termination according to the ABI protocol;

FIG. 5 is a message flow table that shows the translations that need to be done between the IS-634 protocol and the ABI protocol during mobile call termination;

FIG. 7 is a message flow table that shows the translations that need to be done during mobile call origination;

FIG. 25 is a diagram of data structures used in MMA-PDE 1011;

Figure 1:
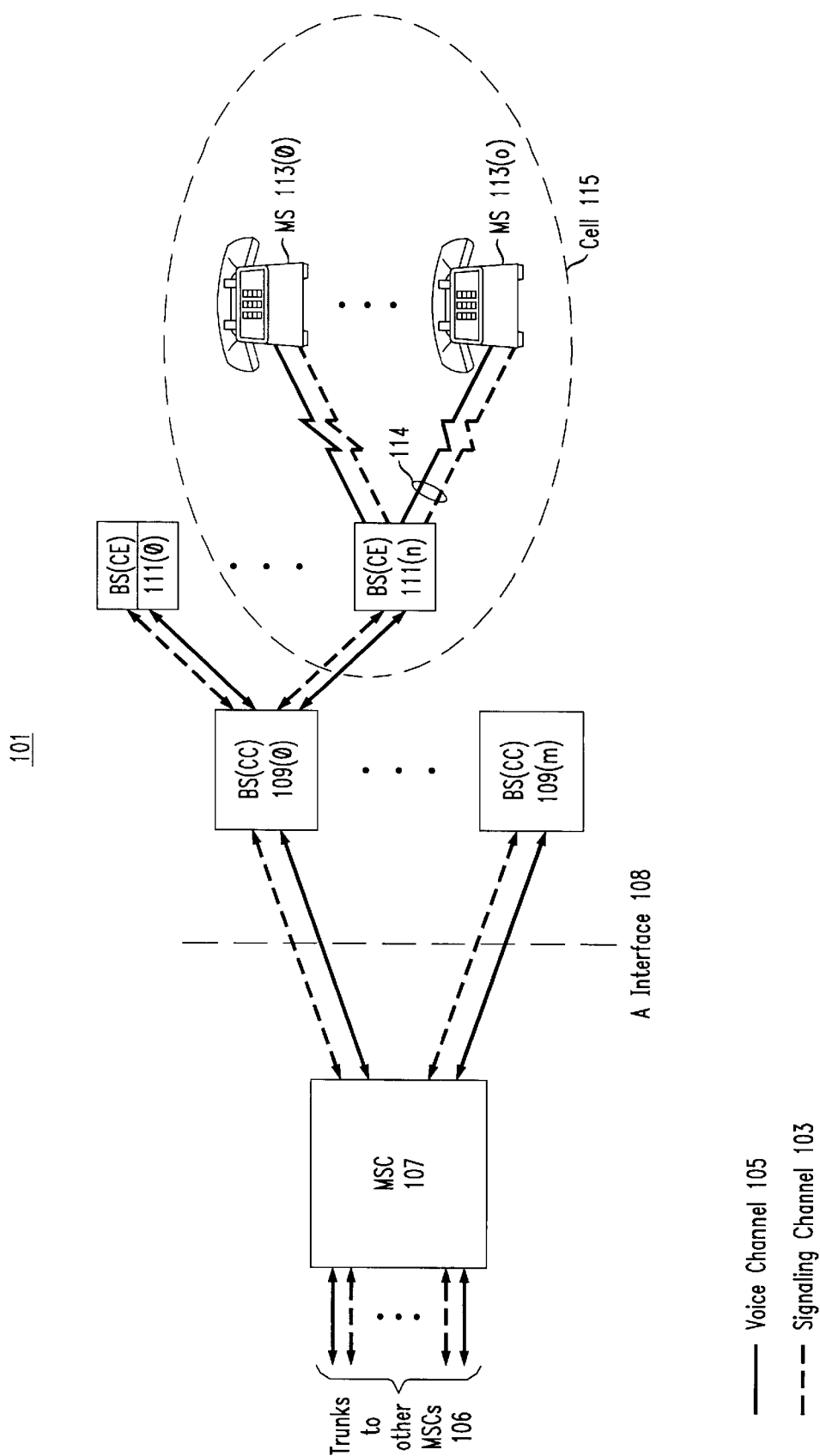
FIG. 1 shows a prior-art mobile telephone system in which all of the components employ the same signaling protocol.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION OF THE PREFERRED EMBODIMENT

Figure 2:
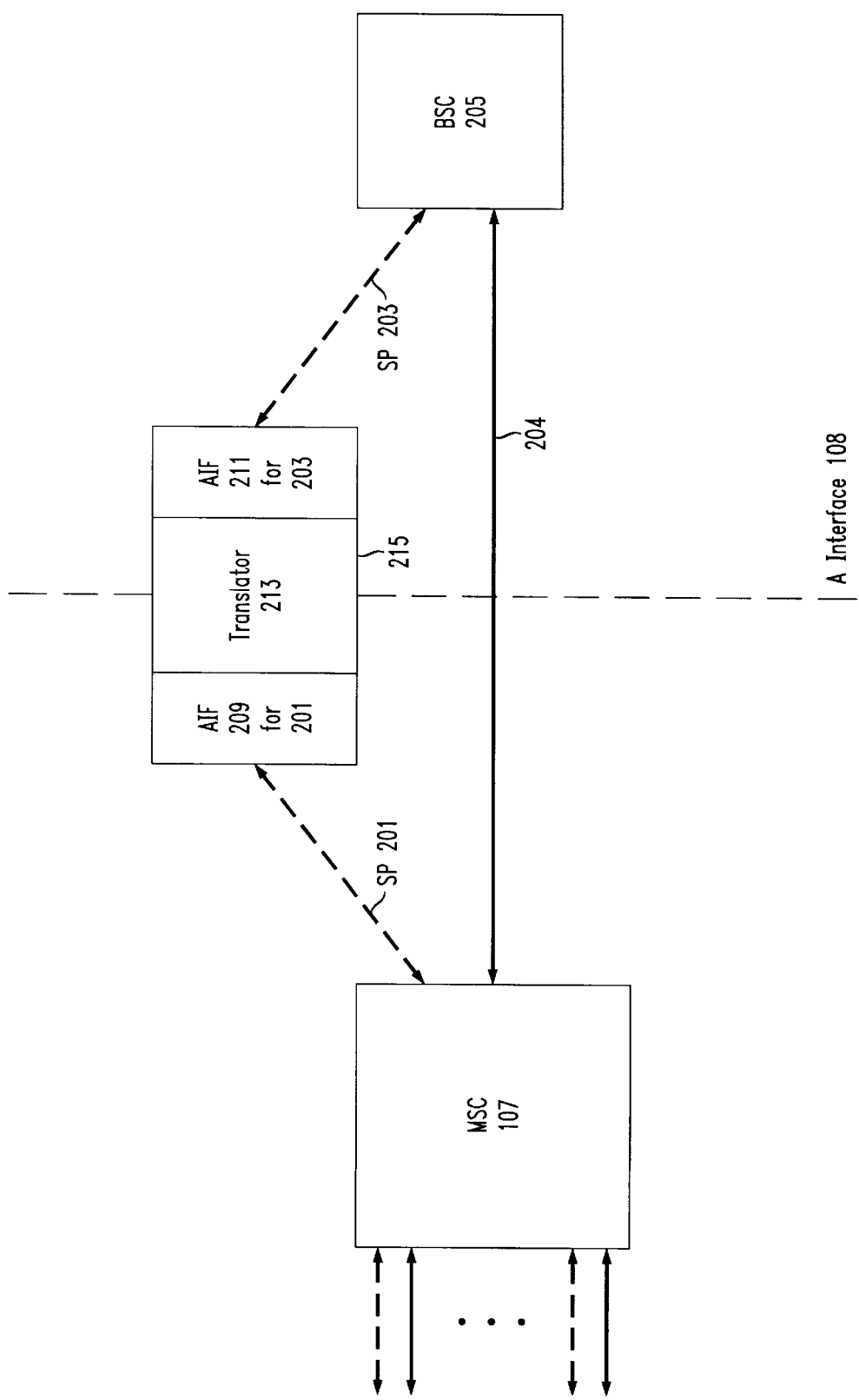
FIG. 2 is a high-level block diagram of a translator for a system of the type shown in FIG. 1 which includes devices that employ different signaling protocols.

Overview of a Protocol Translator: FIG. 2

FIG. 2 shows a protocol translator 215 as it might be employed in a telephone system 201. Telephone system 201 generally resembles telephone system 101, except that mobile switching center (hereafter "MSC") 107 and base station control (hereafter "BSC") 205 use different signaling protocols at A interface 108. Consequently, a protocol translator 215 must be inserted into the signaling channel between MSC 107 and the base stations, represented here by BSC 205. In other configurations, MSC 107 may be communicating directly with its base stations, and in that case, translator 215 must be inserted between MSC 107 and the base stations. It should be noted here that translator 215 may be located anywhere where it can intercept signaling messages between BSC 205 and MSC 107. It may, for example, be a component of MSC 107, a component of BSC 205, or as shown in FIG. 2, an independent component.

Protocol translator 215 must deal with several classes of messages in each of the signaling protocols that it is translating between. Both protocols have call processing messages. These are the messages that actually set up calls, take them down, and perform other operations such as call forwarding and three-way calling.

Both protocols further have Operations, administration, and maintenance, or OA&M messages. These messages serve to operate the network, administer it, and maintain it.

Protocol translator 215 has three parts: 1) an interface 209 for the signaling protocol 201 used at the A interface by MSC 107; 2) an interface 211 for the signaling protocol used at the A interface by BSC 205, and 3) call processing message translator 213, which does the actual translation of sequences of call processing messages in the one signaling protocol into equivalent sequences of call processing messages in the other signaling protocol. Equivalent in this context means that each sequence performs substantially the same function relative to the call. Thus, there is a sequence of call processing messages in signaling protocol 201 that are used in mobile call termination; there is also a sequence of call processing messages that is used for this purpose in signaling protocol 203; these sequences are equivalent, even though they may involve different numbers of messages, may perform different operations, may perform operations in different orders, and may have different timing constraints.

As previously pointed out, telephone signaling protocols include many messages which are not call processing messages. The A interface for each protocol must handle these messages as well as the call processing message. Thus, A Interface (AIF) 209 must handle those messages for signaling protocol 201. Similarly, AIF 211 must handle those messages for signaling protocol 203. If the message was one which should not have reached AIF 209 or 211, AIF 209 or 211 will send an error message; if it was one which does not need to be processed, AIF 209 or 211 will simply drop it; if it is a call processing message, AIF 209 or 211 will act on it. This behavior of AIF 209 makes translator 215 indistinguishable from a BSC that uses protocol 201 and the similar behavior of AIF 211 makes translator 215 indistinguishable from an MSC that uses protocol 203.

An Example of Protocol Translation: FIGS. 3–5

In a preferred embodiment, protocol translator 215 translates between a base station controller which employs a version of the TIA IS-634 signaling protocol at A interface 108 and an Autoplex® system, manufactured by Lucent Technologies, which functions as a mobile switching center. The Autoplex system employs a proprietary signaling protocol known as the AUTOPLEX base station interface (ABI) at A interface 108.; enough will be disclosed concerning the ABI interface to make the operation of a preferred embodiment of translator 215 clear to those skilled in the relevant art. The translation problems which the example demonstrates are generic to translation of telephony signaling protocols and are not peculiar to either the TIA IS-634 signaling protocol or the ABI protocol.

Call Termination According to the IS-634 A-interface Protocol: FIG. 3

Beginning with call termination according to the IS-634 signaling protocol, the messages and timing considerations are shown in FIG. 3. The table shows messages from the MSC and messages from the BSC, which is termed a BS(CC) in the IS-634 protocol, together with the timers employed in each device for call termination. The timers maintain the time constraints for the protocol. The timers are named;+<timer name>+indicates that the timer is set;−<timer name>−indicates when the timer will expire unless it is cleared. In general, when a device sends a message for which it expects a response, it sets a timer; if the device receives the response before the timer expires, it clears the timer; if it does not, an error has occurred. A timer for this purpose will usually be implemented in the software of a switching system processor but those skilled in the art will recognize that the timer function might be achieved by way of logic devices or other hardware circuitry, well known to those skilled in the art. The usual response to such an error is to take down the call. A range of expiration times for the timers are specified in the protocols; for the present discussion, what is important is the sequence in which the timers are set and expire if they are not cleared. The order of the messages and of timer settings and expirations is indicated by their vertical order in the table of FIG. 3.

The first message in the call termination sequence is a paging request message 302 from the MSC; this is a request by the MSC to the BS(CC) to page, that is, get a response from the mobile station that is the destination of the call and report back the location information that the MSC needs to set up a voice channel connection to the mobile station. After sending the message, the MSC sets timer T3113 304; the response of the BS(CC) to the paging request message must be received before the timer expires. The BS(CC) responds to message 302 with a complete L3 info +paging response message 303 that provides the needed information; the BS(CC) further sets two timers, T3230 523 and T303 524. The BS(CC) must receive a setup message 307 from the MSC before T3230 expires. The MSC responds to message 303 with two messages, an SCCP connection confirmed message 305 which indicates to the BS(CC) that a signaling channel has been set up for the call being terminated, and a setup message 307, which contains additional call set up data from the MSC. On sending the setup message 307, the MSC sets timer T307 515. The BS(CC) responds with a call confirmed message 309 which indicates that it has received setup message 307. The message may additionally be used to pass additional feature data to the MSC. The call confirmed message must arrive in the MSC before timer T307 515 expires.

The remainder of the messages deal with setting up the voice channel. First, the MSC sends an assignment request message 311. This message contains an identifier for a voice channel and requests that the BS(CC) assign a voice channel to the mobile station at which the call terminates and associate the identifier with the newly-assigned voice channel. After sending message 311, the MSC sets timer T10 510. Message 311 must arrive in the BS(CC) before T303 524 expires. The BS(CC) makes the assignment and indicates that it has done so by means of an assignment complete message 313 to the MSC, which must arrive before timer T10 510 expires. On receiving assignment complete message 313, the MSC sets timer T301 521; the MSC must receive a connect message 315 from the BS(CC) before timer T301 expires. Message 315 indicates that the mobile station has answered the call. On sending that message, the BS(CC) sets timer T313 525. The BS(CC) must receive a connect ack message 317 from the MSC before timer 525 expires. The MSC's connect ack message 317 is the last message of the call termination sequence.

Call Termination According to the ABI A-interface Protocol: FIG. 4

FIG. 4 shows the sequence 401 of ABI protocol messages 401 that is used for call termination. FIG. 4 is to be read in the same fashion as FIG. 3. Sequence 401 begins with an MGPAGE__C message 403 from the ABI MSC to the ABI base stations, which send paging messages over the air to locate the mobile station at which the call is to terminate. The message includes the mobile station's identifier. On sending message 403, the MSC sets timer CPPRT 503; before the timer expires, message 403 must be answered by a MGPGRSP__C message 405 from the base station indicating the cell in which the mobile station is located. On sending the MGPGRSP__C message, the base station sets timer DEWTCSETUP2 513. In response to MGPGRSP__C message 407, the MSC sends a MGTCSETUP__C message 407 to the base station, which must arrive before timer 513 expires. When message 407 arrives, the base station sets timer DEWASGN2 517. Next, the MSC sends MGSHASGN__C message 411 to the base station. Message 411 identifies the voice channel between the MSC and the base station that is assigned to the call. On sending message 411, the MSC sets timer CPTCCONF 509; message 411 must arrive in the base station before timer DEWASGN2 517 expires. The base station responds to MGSHASGN__C message 411 with a MGTCCONF__C message 413 that confirms that the base station has provided a connection between the mobile station and the voice channel. Message 413 must arrive in the MSC before timer CPTCCONF 509 expires. On arrival of message 413, the MSC sets timer CPCSAT 511. Next, the base station sends an MGANSWER message 415 which indicates that the mobile station has answered the call. The MSC must receive message 415 before timer CPCSAT 511 expires.

While sequence 301 and sequence 401 each performs the call termination operation, a comparison of FIGS. 3 and 4 shows that they do so in different ways. Confirmation to the base station that the call has been set up requires two messages (305,307) in sequence 301, but only a single message 407 in protocol 401. There is no message in protocol 401 corresponding to sequence 301's connect ack message 317. There are further seven constraints in sequence 301, as opposed to five in sequence 401. As might be expected from the above, there are also differences in the way that the information needed to perform the call termination operation is distributed across the messages in the two protocols.

Translating Between the Sequences: FIG. 5

FIG. 5 is a message flow table 501 that shows what must be done in call processing message translator 213 to translate between the sequence 401 of messages in signaling protocol 201 and the sequence 301 of messages in signaling protocol 203 that are used to do mobile call termination. The message flow table uses the same notation for messages and timers as FIGS. 3 and 4 and messages and timers in FIG. 5 have the same reference numbers that they have in FIGS. 3 and 4. The table has three columns: the left-hand column shows messages of signaling protocol 201 that are produced by MSC 107 together with timers that MSC 107 sets in the course of sending the messages.

The right-hand column shows the messages of signaling protocol 203 that are produced by BS(CC) 205, together with timers that BS(CC) 205 sets in the course of sending the messages. The center column shows the behavior of call processing message translator 213. In doing a mobile call termination, translator 213 must provide messages of sequence 401 of protocol 201 to MSC 107 and messages of sequence 301 of protocol 203 to BS(CC) 205. Translator 213 must set timers that would be set in the ABI protocol by the ABI base station and in the IS-634 protocol by the IS-634 MSC 107. In FIG. 5, timers with names of the form T<number>, for example, T3113, are IS-634 timers; the rest are ABI timers. The > and < symbols in the narrow columns separating the wide columns indicate the direction of message flow.

In detail, call processing message translator 213 proceeds as follows:

1. When it receives a MPAGE__C message 403 from MSC 107, it respond by sending a paging request message 302 to BS(CC) 205 and setting timer T3113 304;
2. If it receives a PAGING RESPONSE message 303 from BS(CC) 205 before timer T3113 expires, it responds by sending an SCCP_connection_conf message 305 to BS(CC) 205, a MGPGRSP__C message 405 to MSC 107, and setting timer DEWTCSETUP2 513.
3. If translator 213 receives a MGTCSETUP__C message 407 from MSC 107 before timer 513 runs out, it sends a SETUP message 307 to BS(CC) 205 and sets timer T303 515.
4. If translator 213 receives a CALL_CONFIRMED message 309 from BS(CC) 205 before timer T303 515 expires, translator 213 sets timer DEWASGN2 517.

5. If translator 213 receives a MGSHASGN_C message 411 from MSC 107 before timer DEWASGN2 517 expires, it sends an ASSIGNMENT REQUEST message 311 to BS(CC) 205 and sets timer T10 519.
6. If translator 213 receives an ASSIGNMENT_COMPLETE message 313 from BS(CC) 205 before timer T10 519 expires, translator 213 sends a MGTCCONF_C message 413 to MSC 107 and sets timer T301 521.
7. If translator 213 receives a CONNECT message 315 from BS(CC) 205 before timer T301 521 run out, it sends a MGANSWER message 415 to MSC 107 and a CONNECT ACK message 317 to BS(CC) 205.

It should be pointed out here that call processing message translator 213 uses information contained in the messages it receives to make the messages it sends and that it is often necessary to translate the information from the form used in the received message to a different form used in the sent message. For example, the ABI protocol and the IS-634 protocol use different representations of the mobile telephone's telephone number. It should further be pointed out that in MSC 107, BS(CC) 205, and translator 213, expiration of a timer before an expected message is received is an error condition. In dealing with the error condition, MSC 107 and translator 213 may exchange messages from protocol 201 that are not shown here and BS(CC) 205 may similarly exchange messages from protocol 203. Translator 213, however, translates sequences including the error messages in the same general fashion that it translates the normal sequence shown in FIG. 5.

Figure 6:
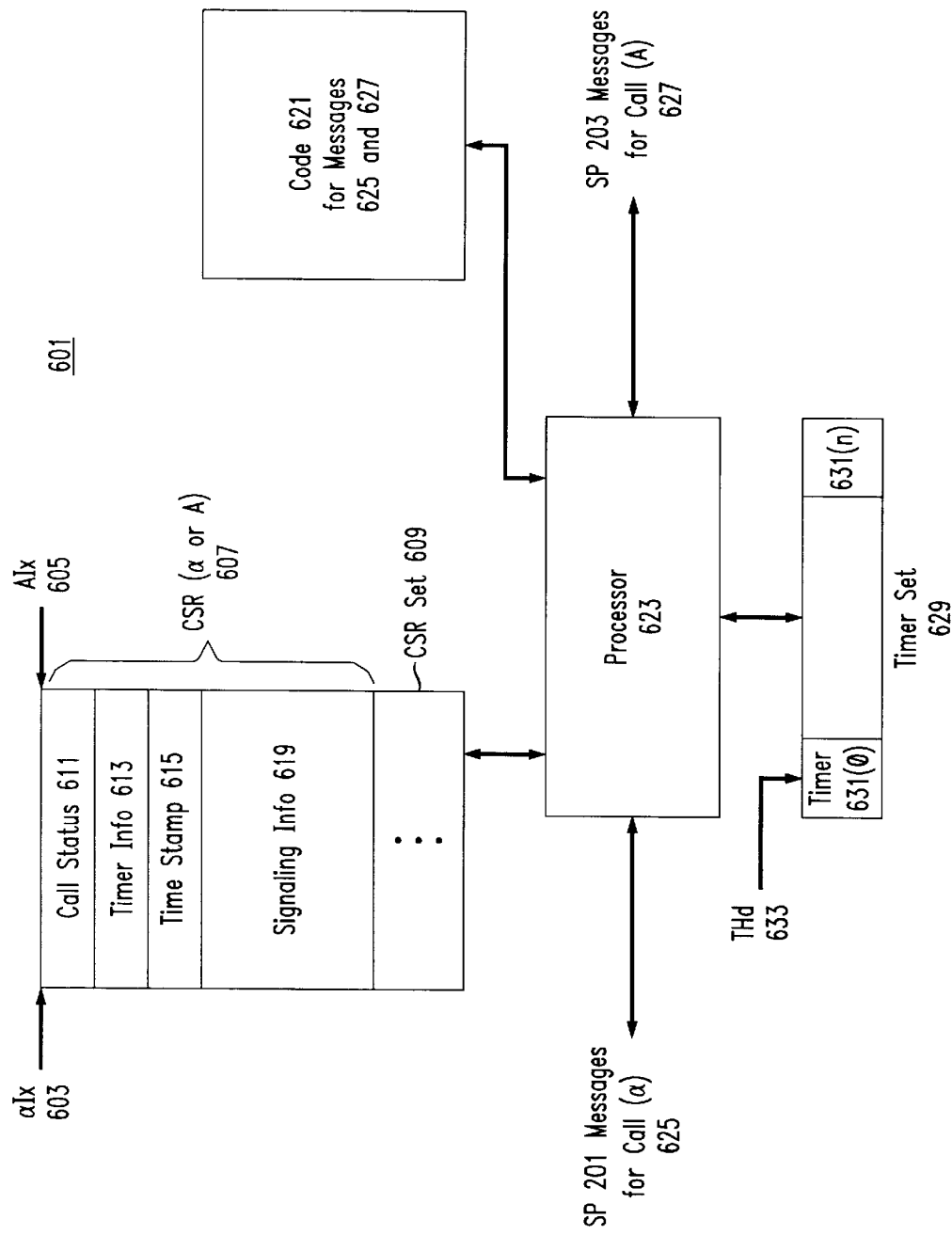
FIG. 6 is a logical block diagram of an implementation of a call processing message translator 213.

Implementing Translator 215: FIG. 6

FIG. 6 is a logical block diagram of an implementation 601 of call processing message translator 213. Implementation 601 includes a processor 623 which responds to and produces call processing messages 625 belonging to signaling protocol 201 and call processing messages 627 belonging to signaling protocol 203. Messages 625 are received from and provided to MSC 107 and messages 627 are received from and provided to BS(CC) 205. The messages responded to by the processor are associated with a single telephone call, which may be identified in different fashions in signaling protocols 201 and 203. That fact is indicated by the use of to represent the call identification for messages 625 and of A to represent the call identification for messages 627. Of course, processor 623 may respond substantially simultaneously to messages for many different calls at once.

Each call presently being handled by processor 623 has a call state record 607 associated with the call. The call state records make up call state record set 609. The call state record for a given call may be indexed either by the call identification represented by or by the call identification represented by A. Each call state record includes at least signaling information 611 which indicates the status of the call. In a preferred embodiment, the call status information identifies a message belonging to signaling protocol 201 or signaling protocol 203. Depending on the circumstances, it may either be the last message sent or the last message received. If one or more timers are involved at the stage of the call presently represented by CSR 607(), the record will include handles for timers 631 in a set of timers 629 accessible to processor 623. In the preferred embodiment, CSR 607() further includes a time stamp 615, which is used to determine whether CSR 607() may be recycled, and signaling information 619, which is used to store data from one message that is required to process another later message. For example, when processor 623 responds to PAGING RESPONSE message 303, it saves information received in that message in signaling info 619 for later use when it responds to MGTCSETUP_C message 407.

When processor 623 responds to a message, it executes code 621, which contains code corresponding to each of the messages in SP 201 and SP 203. What happens when the code is executed depends further on the contents of CSR 607() for the call. The behavior of the code will depend on the current value of call status 611. If there is a timer involved, the behavior of the code will vary depending on whether the timer expires, and it may also vary depending on the contents of signaling info 619. Of course, as the code processes the message, it also updates CSR 607() as required, at a minimum by changing call status 611 to indicate the last message received or sent, but also by setting timers and storing their handles in area 613 and by updating signaling info 619, if those actions are required.

It will be apparent to those skilled in the art of telephony protocols that implementation 601 is capable of carrying out the translation between call termination sequence 301 and call termination sequence 401 shown in FIG. 5, and indeed the translation of any other equivalent sequences of call processing messages belonging to signaling protocol 201 and signaling protocol 203. Implementation 601 is able to deal with the complexity of translating between these sequences by it use of call state record 607 to store the state of the call so that it is available to each message in turn.

At a minimum, the state includes the call status 611; in many cases, it will include one or more timers 631 and/or signaling information 619.

Another Example: Mobile Origination: FIG. 7

FIG. 7 is the message flow table 701 for mobile origination. Given the foregoing, the reader will easily understand from it how translator 213 translates between mobile origination sequence 715 of switching protocol 201 and mobile origination sequence 717 of switching protocol 203. Many of the messages used in sequences 301 and 401 for call termination appear in sequences 715 and 717 respectively. The only new message from switching protocol 201 is MGORG_C 705, which provides the identification of the cell from which the call is originating together with call set up information from the mobile station to MSC 107. The new messages from switching protocol 203 include COMPLETE_L3_INFO+COM_SVC_REQ 701, which is a request from BS(CC) 205 for service for a call that has originated at a mobile telephone located in a cell served by a BS(CE) connected to BS(CC) 205;

SETUP 703, which has additional call setup data; and call_proceeding 707, which indicates that the MSC is doing the set up.

Details of a Presently-preferred Embodiment of Implementation 601

The following discussion will begin with a presentation of the hardware environment in which the implementation operates, will continue with a description of its software architecture and of the important data structures, and will finish with a detailed description of the implementation of the translation for the messages used in the mobile termination operation shown in message flow table 501.

Figure 8:
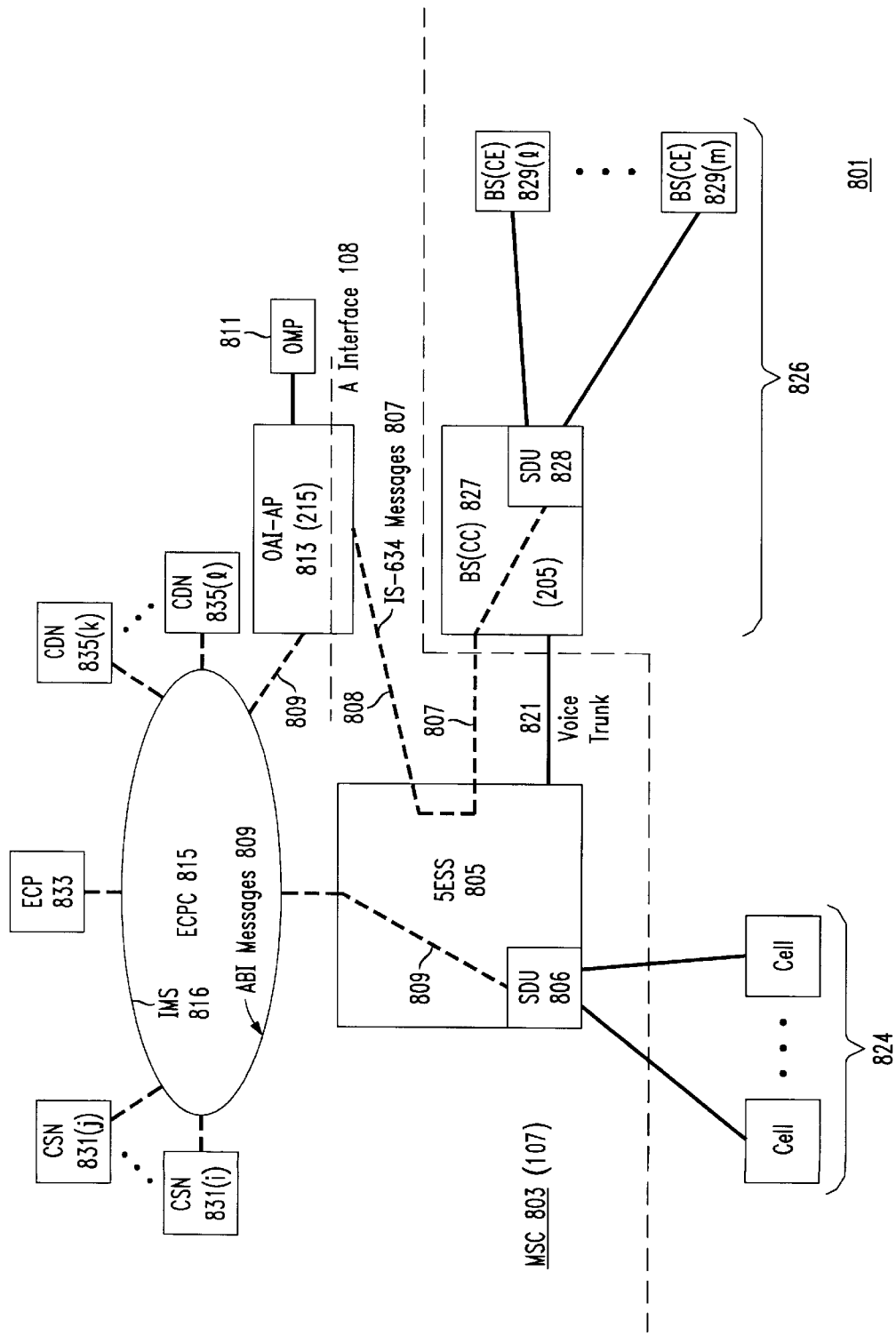
FIG. 8 is an overview of a hardware environment in which implementation 601 operates.

Overview of the Hardware Environment: FIG. 8

FIG. 8 shows hardware environment 801 in which implementation 601 operates. In FIG. 8, where an item has a reference number from an earlier figure in parentheses, the item is an implementation of the reference number in parentheses. Hardware environment 801 includes an AUTOPLEX system that functions as an ABI MSC 803. It is thus an implementation of MSC 107 in FIG. 1. MSC 803 serves as an MSC for two different kinds of cellular telephone systems, one, indicated by bracket 826 which operates according to the IS 634 protocol at A interface 108, and another, indicated by bracket 824, which operates according to the ABI protocol at A interface 108. The cellular system indicated at 826 has a BS(CC) 827 and a number of base stations 829, which in the terminology used in the IS 634 protocol are BS(CE), and operates in the manner previously discussed.

At the heart of MSC 803 is an executive cellular processing complex (ECPC) 815. ECPC 815 consists of a group of devices which communicate with each other by means of messages that are sent and received via IMS ring 816, which is a high-speed data transfer device. The devices include a 5ESS®) switch manufactured by Lucent Technologies, as well as one or more cell site nodes (CSNs) 831, which are the interface between cells 824 and ring 816, one or more call processing/database nodes (CDNs) 835, which do call processing activity, an executive control processor (ECP) 833, which oversees operation of MSC 803, and one or more open A attached interface processors (OAI-AP) 813, which are implementations of translator 215.

The ABI protocol consists of messages 809 which cells 824 send and accept. CSN 831 provides these messages to and receives them from the cells 824 and ring 816. OAI-AP 813 also sends and accepts messages belonging to the ABI protocol, and consequently appears to other devices on ring 816 to be a CSN 831; in fact, however, OAI-AP 813 translates between the ABI protocol used in IMS 816 and the devices attached thereto and the IS-634 protocol used in portion 826 of hardware environment 801. As indicated by the dotted line labeled A interface 108, OAI-AP 813 presents an ABI A interface to the devices on ring 816 and an IS-634 A interfaces to BS(CC) 827. OMP 811 is an operations and maintenance processor.

Of course, any device attached to IMS 816, including OAI-AP 813 must be able to respond in the proper fashion to any ABI message which it receives via IMS 816. In general, there are two ways of responding:

if the message is addressed to the device and is of the proper kind for the device, accepting the message;

if the message is addressed to the device and is not of the proper kind for the device, sending an ABI error message.

Accepting a message generally means acting on it; however, in the case of OAI-AP 813, it may mean simply dropping the message. OAI-AP 813 does the latter when it receives an ABI message that a CSN 831 would act upon but which is meaningless in the context of system 826. Similarly, OAI-AP 813 must be able to respond properly to any IS-634 message it receives from BS(CC) 827; there are in general the same two ways of responding.

Hardware environment 801 operates as follows: Cells 824 are connected to an SDU 806 in SESS switch 805. SDU 806 encodes and decodes the voice signals and control signals transmitted to and received from cells 824. The decoded voice signals may then go via voice trunks such as voice trunk 821 to devices such as BS(CC) 827 or other telephone switches that are connected to 5ESS 805 via voice trunks. 5ESS 805 makes ABI messages 809 from the decoded control signals and sends the ABI messages to and receives them from cell 824's CSN 831 in IMS ring 816. The same approach is taken with call processing. Much of the information that SESS 805 needs to do call processing is provided by the CDNs 835, and 5ESS 805 gets and provides the information by means of messages which it sends to and receives from the CDNs 835.

The difference between OAI-AP 813 and a standard CSN 831 is that the system that is served by OAI-AP 813 uses the IS-634 protocol rather than the ABI protocol. The connection of system 826 to MSC 803 has two parts: voice trunk 821, which carries the voice signals, and SS7 signaling channel 807, which carries IS-634 messages 807.

Both of these connections are made via 5ESS 805, which has a voice trunk 821 connecting it to BS(CC) 827 and an SS7 signaling channel 807 connecting it to BS(CC) 827 and another SS7 signaling channel 808 connecting it to OAI-AP 813. 5ESS 805 treats voice trunk 821 like any other voice trunk connected to it. 5ESS 805 transfers IS-634 messages between OAI-AP 813 and BS(CC) 827 by means of signaling paths 807 and 808. BS(CC) 827 also has an SDU 828 for encoding and decoding voice and control signals that it sends to and receives from its BS(CE)s 829. The voice signals are sent to and received from voice trunk 801; the control signals become IS-634 messages and are sent to and received from SS7 signaling channel 807, which of course is coupled to signaling channel 808 and thereby to OAI-AP 813.

Figure 9:
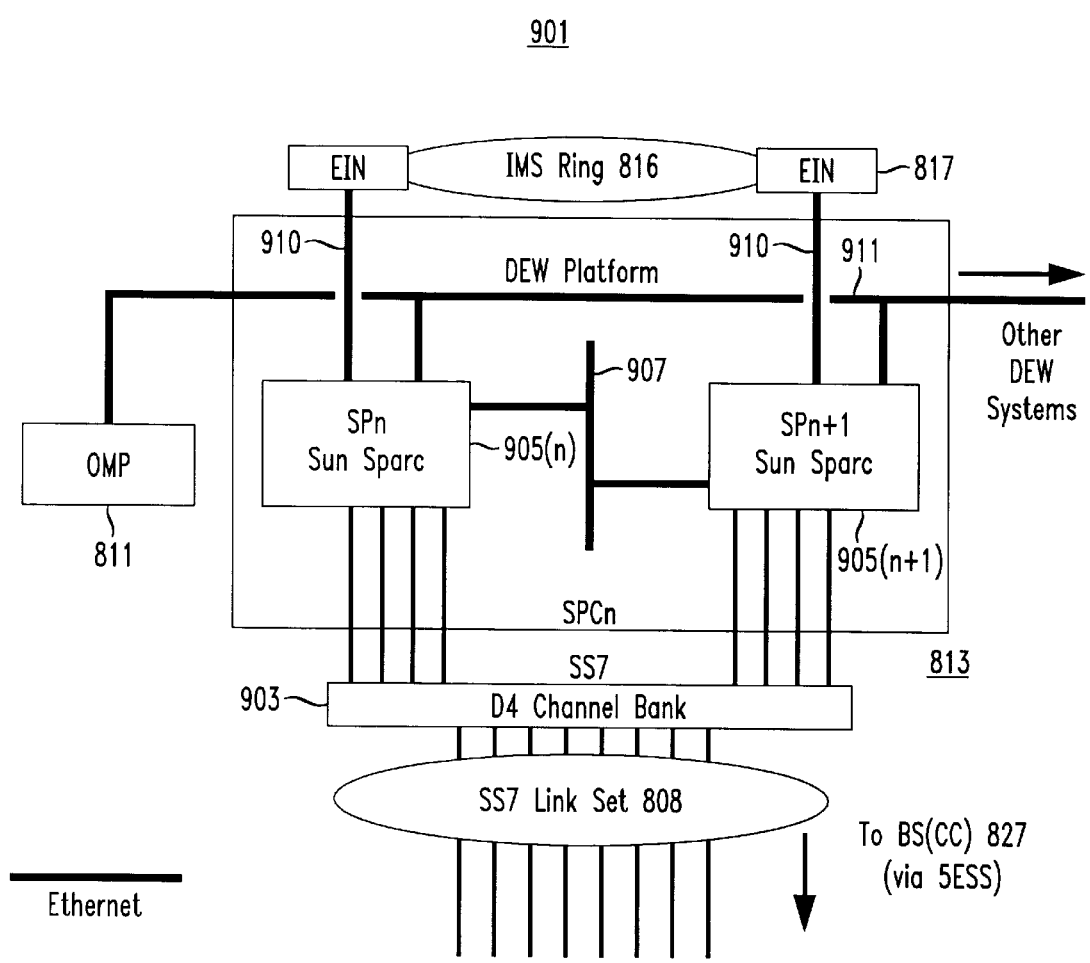
FIG. 9 is a block diagram of the hardware components of OAI-AP 813.

Hardware Implementation of OAI-AP 813: FIG. 9 813.FIG. 9 shows the hardware components of OAI-AP 813. OAI-AP 813 includes two Sparc® processors 905 manufactured by Sun Microsystems, Inc. The processors translate between call processing messages in the IS-634 protocol and call processing messages in the ABI protocol in parallel. Each processor is linked by an Ethernet 910 to an Ethernet interface node (EIN) 817 on IMS 816. EIN 817 simply converts between the Ethernet data communications protocol and the data communications protocol used on IMS 816. The processors 905 are linked by an Ethernet 907, and in the event of a failure by one of the processors, the other continues to process messages. The effect of this arrangement is to make OAI-AP 813 fault tolerant. The paired SPARC processors communicate with the other components of ECPC 915 via Ethernet 910 to EIN 817 and ring 816. OMP 811 communicates with processors 905(n and n+l) and with other OAI-AP systems via Ethernet 911. Communication with SESS 819 and from there to BS(CC) 827 is via SS7 link set 808, which D4 channel bank 903 divides among the two processors 905.

Figure 10:
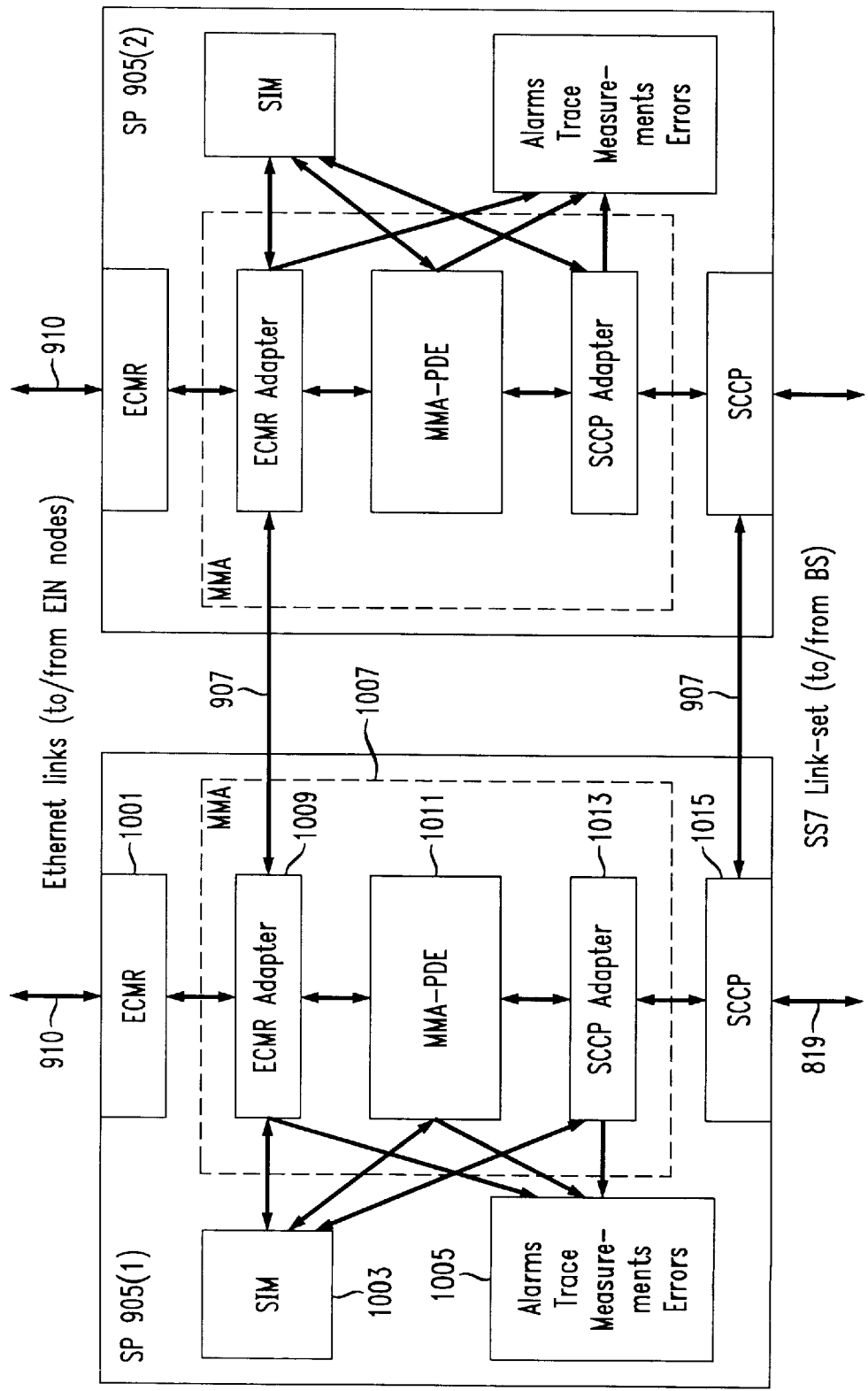
FIG. 10 is a block diagram showing the software architecture of OAI-AP 813.

Software Architecture of OAI-AP 813: FIG. 10

FIG. 10 shows the architecture of the software executed by each of the processors 905 in OAI-AP 813. Since the software is identical, only the software on SP 905(1) will be dealt with in detail. ECMR 1001 is an implementation of A interface 209 for the ABI protocol; SCCP 1015 is an implementation of A interface 211 for the IS-634 protocol; MMA 1007 is an implementation of translator 213 between equivalent sequences of call processing messages from the two protocols. SIM 1003 is a system integrity module which provides high-level process management functions. Alarms, etc. 1005 is a measurement and alarm interface available to the applications running on SP 905(1).

The portions of the architecture which are important for the present discussion are ECMR 1001, SCCP 1015, and MMA 1007. As the implementation of A interface 209 for the ABI protocol, ECMR 1001 has two basic functions: to deal correctly with all ABI protocol messages that it receives via IMS ring 816 and places on ring 816 and to transfer ABI call processing messages to and from MMA 1007. OAI-AP 813 has an address on ring 816, and each ABI protocol message has a type field which identifies what kind of message it is. Each device on ring 816 can deal only with certain types of ABI messages, and it can only accept messages of those types. For example, an ABI BS may send an MGORIG_C message 705 but not receive one; consequently, it is an error if OAI-AP 813 receives such a message from ring 816.

What happens when a device accepts a message depends of course on the device. In the present case, OAI-AP 813 appears to the other devices on IMS ring 816 accepts the same messages as a cell site node (CSN) 831. It is, however, not a cell site node 831, and there are some ABI messages that specify functions that have no equivalents in the IS-634 protocol. In such cases, OAI-AP 813 accepts the message but simply drops it, i.e., does nothing with it. For example, the ABI protocol includes a message that specifies that a request by a mobile unit be audited; there is nothing equivalent to this action in the IS-634 protocol, so OAI-AP 813 simply drops the message., that is, it accepts it but does nothing, that is to say, it neither responds with an error message nor passes it on to MMA 1007.

SCCP 1015 implements A interface 211 for the IS-634 and behaves similarly with regard to IS-634 protocol messages. Like ABI protocol messages, these messages are addressed to specific devices and have message type codes. OAI-IP 813 appears to BS(CC) 826 to be a an IS-634 MSC; consequently, if the message is addressed to OAI-AP 813, but is not one of the types of messages that an IS-634 MSC should receive, SCCP 1015 responds with an error message; if the message does have one of the proper types, SCCP 1015 responds by accepting the message, and depending on the kind of message, may either pass it to MMA 1007 or drop it. Additionally, of course, SCCP 1016 sends IS-634 messages received from MMA 1007 to the destination BS(CC) 827.

The actual translation of sequences of call processing messages is done by message mapping application (MMA) 1007. MMA 1007 has three components: ECMR adapter 1009, which receives ABI messages from and writes them to ECMR 1001, and SCCP adapter 1013, which does the equivalent with IS-634 messages and SCCP 1015. ECMR adapter 1009 and SCCP adapter 1013 place the messages they receive at the tail of a master queue in SP 905 (1)'s memory . The translation itself is done in MMA-PDE 1011. MMA-PDE 111 consists of a number of processing descriptor engine (PDE) processes running on SP 905(*i*). Each process reads a message from the head of the master queue and executes a processing descriptor, or PD, for the message. Under control of the PD, the PDE determines the state of the call the message belongs to from the call's CSR 607 and processes the message according to the state of the call (indicated by the data in CSR 607), the contents of the message, and the state of any timers (indicated in CSR 607) currently associated with the call. As part of processing the message, the PDE updates the state of CSR 607 for the call and may also set timers and write messages to ECMR adapter 1009 or SCCP adapter 1013. In processing the message, the PDE may execute other PD's, for example, if a timer expires while the message is being processed. At the end of processing, the state in CSR 607 is set to identify the last message received or sent. The message processing just described continues as long as SP 905(1) is operational. If SP 905(1) fails, messages are diverted to SP 905(2), as shown at links 907. Since processing of calls currently being processed depends on state in the failed processor, messages for those calls will result in error conditions in SP 905(2) and those calls will fail; processing of calls set up after the failure of SP 905(1) will, however, proceed in a normal fashion.

Figure 11:
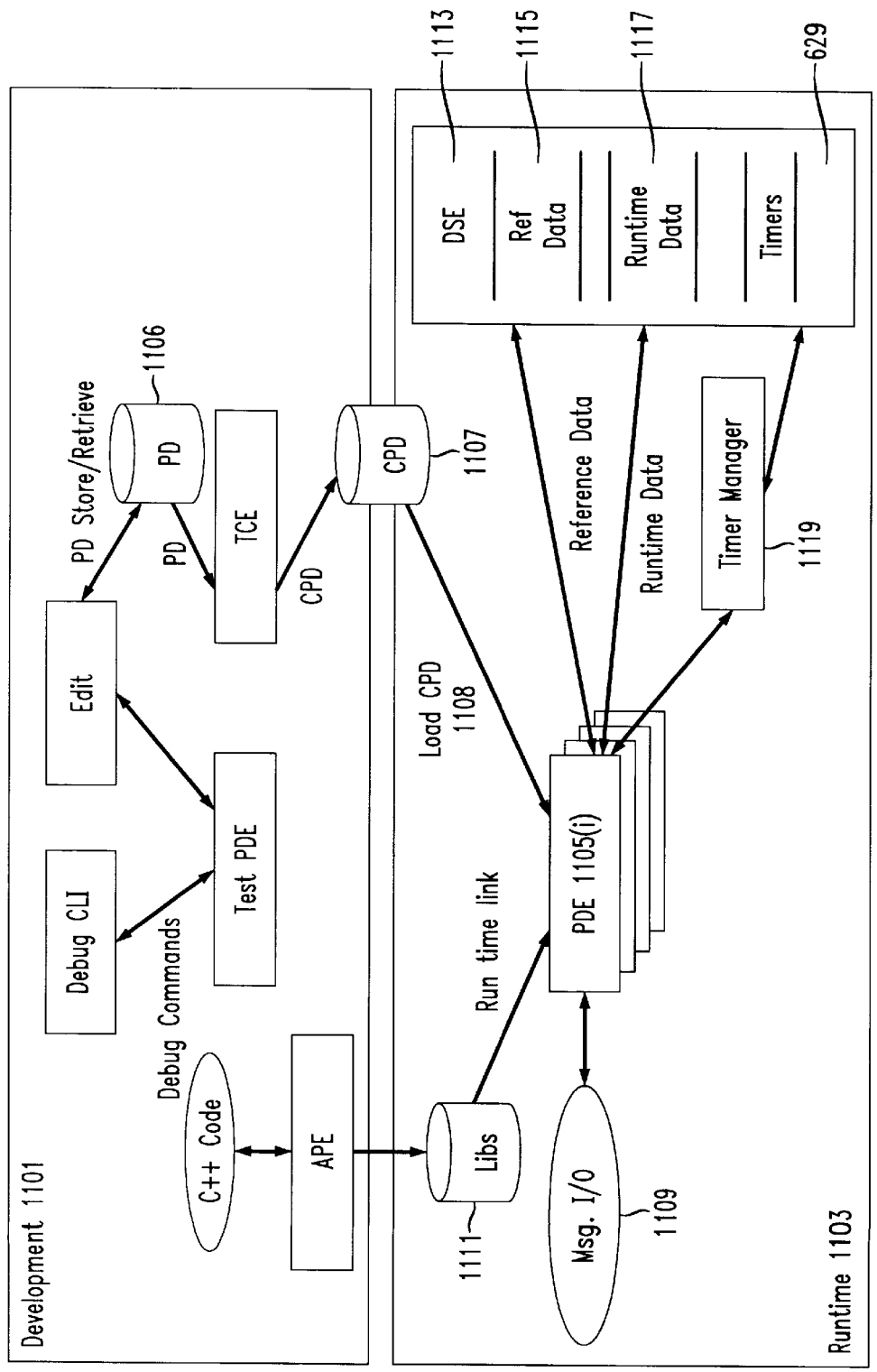
FIG. 11 is a detailed block diagram of MMA-PDE 1011.

Details of MMA-PDE 1011: FIGS. 11 and 25

FIG. 11 shows the details of the software architecture of MMA-PDE 1011 and of how the process descriptors and other code executed by the PDEs are created. The code is created in development portion 1101 of FIG. 11. As shown there, library routines executed by the PDEs are written in the well-known C++ programming language using an application programming environment (APE) for the PDE. The PDs appear at 1106 in FIG. 11. They are written in a special high-level language and compiled to produce compiled PDs (CPD) 1108, which are actually executed by a PDE.

Processing of calls is done by runtime 1103. The main component of runtime 1103 is a set of n PDEs 1105, each of which is a process executing on an SP 905. The code executed by the PDEs 1105 includes compiled PDs 1108, stored at 807, and library routines stored in 111 that are used in execution of the compiled PDs 1108. MSG I/O 1109 is the interface between MMA-PDE 1011 and ECMR Adapter 1009 and SCCP adapter 1013. Data store environment (DSE) 1113 contains the data used by a PDE 1105 as it processes messages. Included in DSE 1113 are reference data 1115, which contains various parameters that are used to determine the behavior of PDEs 1105, runtime data 1117, which will be explained further flow, and timers 629, which are managed by timer manager component 1119.

Runtime data 1117 is the data which changes in the course of processing a call message. It is shown in more detail in FIG. 25. Included in runtime data 1117 are: the call state records 607, of which one exists for each call currently being processed;

- a single master queue 2501 which is used by all PDEs 1105 in the MMA. All protocol messages received in SP 905 are placed in master queue 2501 in the order in which they are received.
- a set of local queues 2503. There is one local queue 2503 per PDE 1105. Local queue 2503 is used to hold a protocol message for a call that is received in MMA 1007 while local queue 2503's PDE 1105 is processing a previous protocol message for the call.

Figure 12:
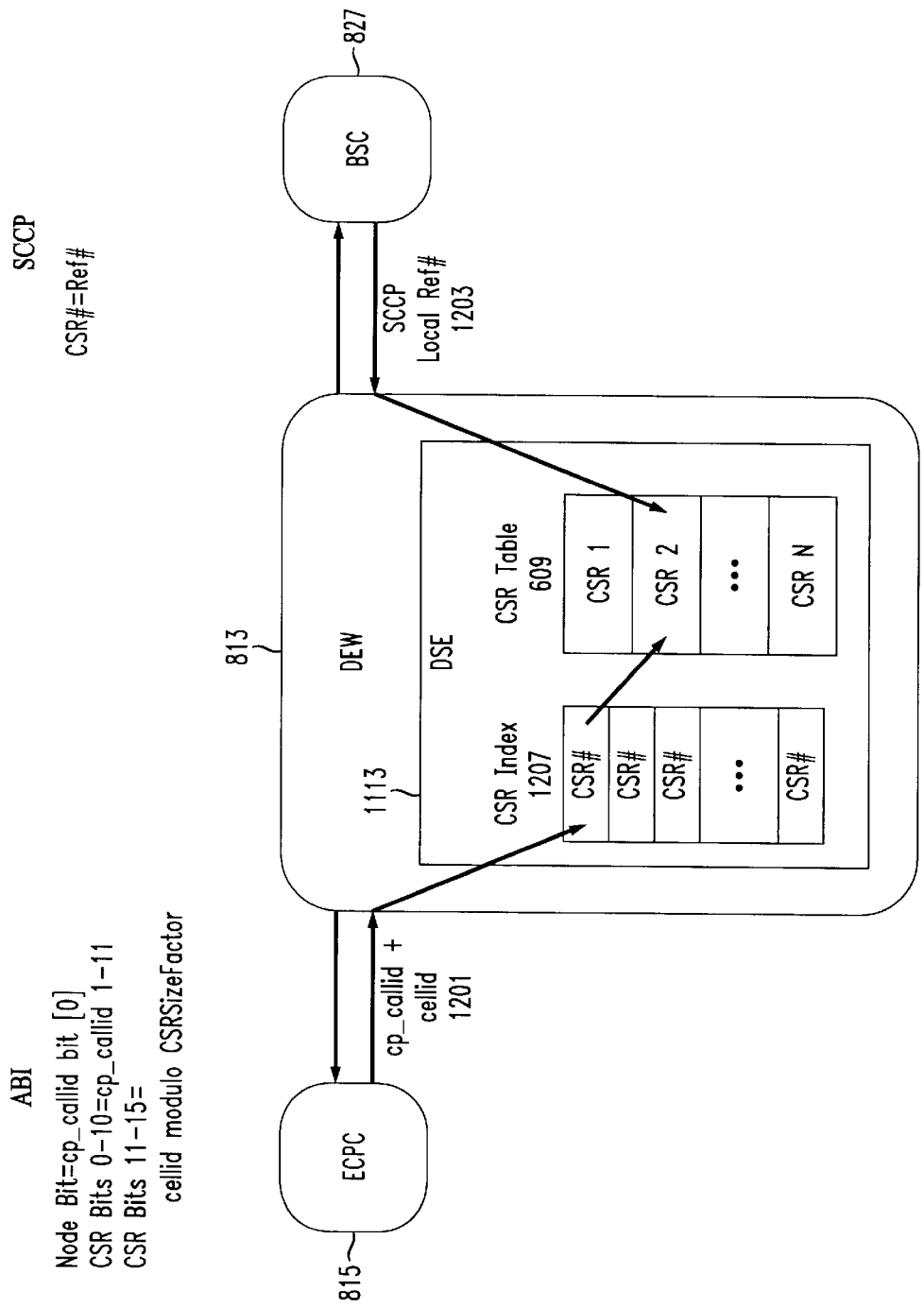
FIG. 12 is a diagram of how CSRs 607 are indexed.
Figure 13:
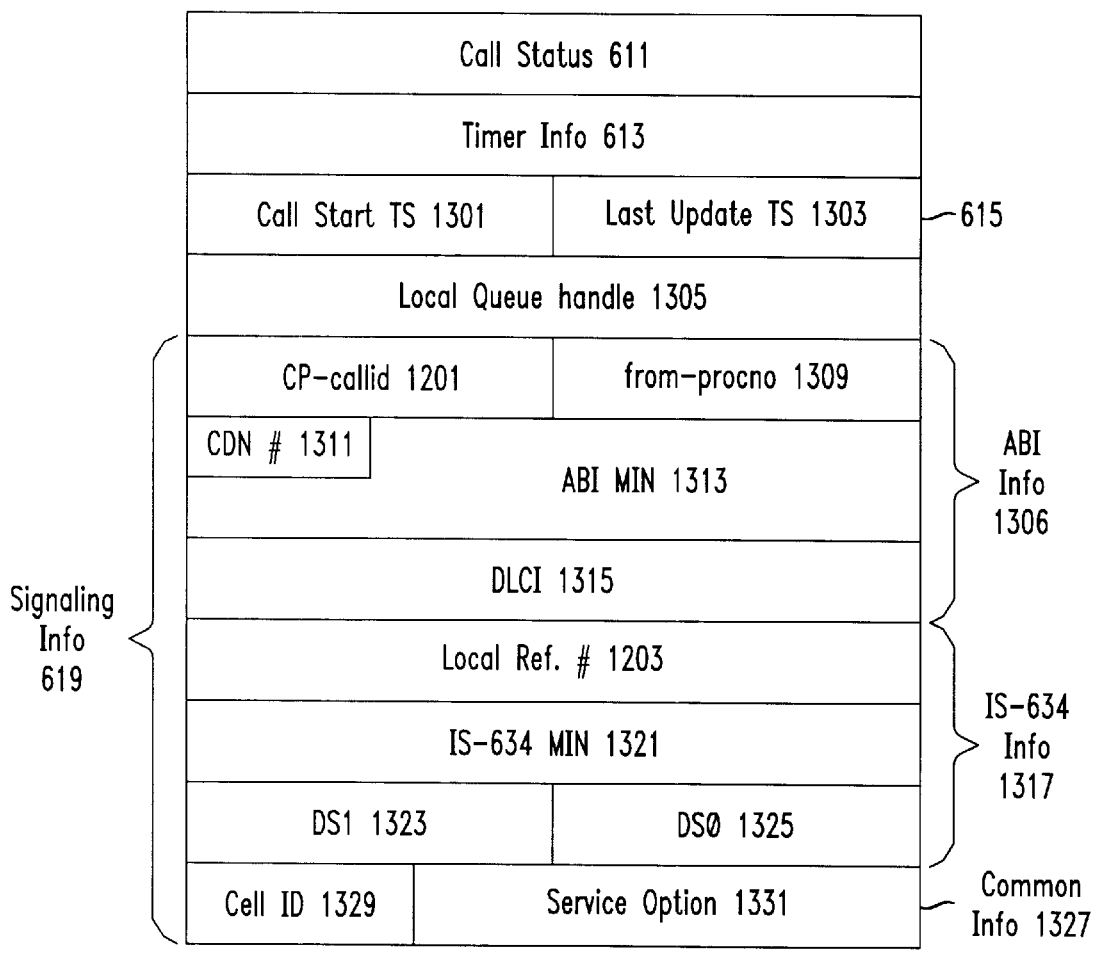
FIG. 13 is a diagram of the fields of a CSR 607.

Details of CSRs 607: FIGS. 12 and 13

As indicated in the discussion of FIG. 6 above, each of the two protocols between which messages are being translated may use different ways of identifying calls, and CSRs 607 are indexed by both methods. FIG. 12 shows how this double indexing is implemented in a preferred embodiment for the ABI and IS-634 protocols. The indexing is simplest with the IS-634 protocol. There, a new call is assigned a local reference number 1203 by the MSC, and in the preferred embodiment, each CSR 607 has a number in CSR table 609. Since the new call must be assigned a CSR 607, the number of the CSR 607 becomes local reference number 1203 for the call in the IS-634 protocol. With the ABI protocol, the call is identified to the base station by means of an identifier made by combining a call ID provided by ECPC 815 and a cell identifier for one of the minicells 824. MMA-PDE 1007 simply treats the combined number as a call identifier.

That number 1201 is used as an index into CSR index table 1207, and the entry at that index contains the CSR number for the CSR 607 in CSR table 609.

FIG. 13 shows the contents of a CSR 607 in a presently-preferred embodiment in detail. Call status 611 belongs to a set of values, each of which is associated with a message processing PD 1106. When a message processing PD finishes execution, it sets call status 611 to the value associated with the message processing PD. Timer info 613 may contain handles for active timers 631. In a preferred environment, a CSR 607 may have up to two active timers associated with it. Timestamps 615 in a preferred embodiment contains two timestamps, one of which, 1301, indicates the time at which the call presently associated with the CSR 607 began. The other timestamp, 1303, indicates the last time at which the call status record 607 was updated. The timestamps are used to prevent CSRs 607 from being "lost" if the call associated with the CSR 607 terminates in such fashion that CSR 607 is not freed when the call terminates. Local queue handle 1305 is a handle for local queue 2505 for the PDE 1105 that is handling the call currently associated with CSR 607. Handle 1305 also serves to identify PDE 1105 that is handling the call.

Signaling information 619 contains three sections, ABI information 1306, which contains information used to deal with messages belonging to the ABI protocol, IS-634 information 1312, which contains information used to deal with messages belonging to the IS-634 protocol, and common information 1327, which is information used in messages belonging to both protocols. The following fields are included in ABI information 1306:

cp_callid 1201, which identifies the call to the MSC in the ABI protocol;

from_procno 1309, which identifies a process in ECPC 815 that is sending the ABI message currently being processed;

CDN number 1311, which is an identifier for the CDN 835 on ring 816.

ABI MIN 1313 is the representation of the telephone number for a mobile telephone in the ABI protocol; it is a 34-bit value; and DLCI 1315 is the number of the terrestrial circuit in the format required by the ABI protocol.

IS-634 information 1317 contains the following fields:

local reference number 1203, which is the identifier for the call in the IS-634 protocol; as mentioned above, in the preferred embodiment, local reference number 1203 is also the index of CSR 607 in CSR table 609;

IS-634 MIN 1321 is the representation of the telephone number for the mobile station in the IS-634 protocol; it is a BCD representation of the telephone number (1 byte per digit).

DS1 1323 and DS0 1325identify the trunk circuit for the call in the IS-634 protocol; DS1 1323 identifies the trunk; DS0 11325 identifies a circuit in the trunk.

Common information 1327, finally, has two fields:

cell ID 1329, which indicates the cell belonging to the BS(CE) in which the mobile telephone is currently located; and service option 1331, which indicates what classes of service the mobile telephone has.

Details of Protocol Translation in a Preferred Environment: FIGS. 14–24

The following discussion of protocol translation will first present an overview of the architecture of the processing descriptors and of protocol translation generally in a presently-preferred embodiment and will then describe the message processing for mobile call termination in detail.

Figure 14:
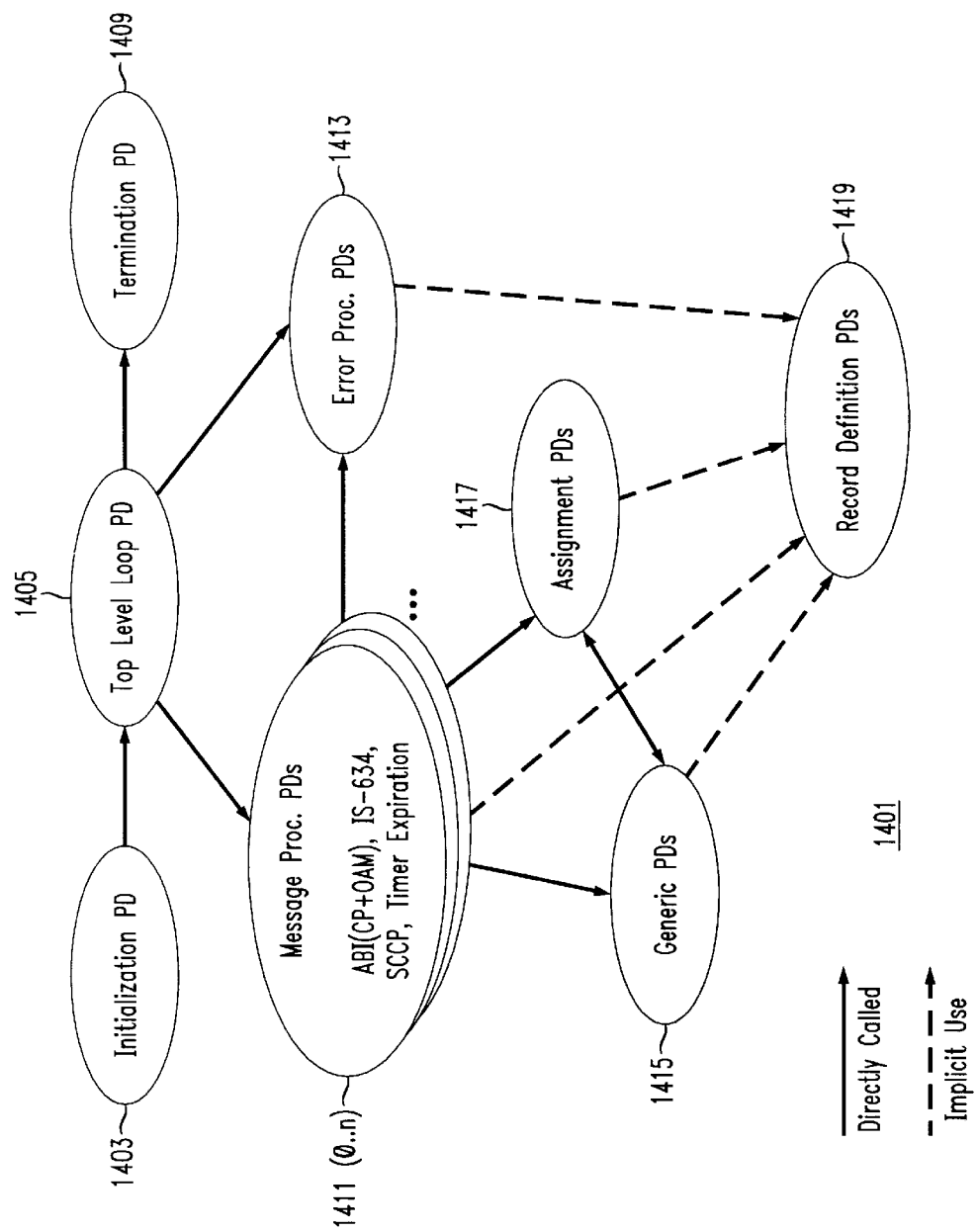
FIG. 14 is a diagram of the hierarchy of processing descriptors in a preferred embodiment.

The Processing Descriptor Hierarchy: FIG. 14

FIG. 14 shows the hierarchy 1401 of processing descriptors 1106 employed in a presently-preferred environment. Ovals in FIG. 14 indicate processing descriptors 1106; arrows indicate relationships between processing descriptors 1106, with solid arrows indicating calls from one processing descriptor to another and dotted arrows indicating implicit use by one processing descriptor of the facilities provided by another.

At the top level of hierarchy 1401, there are three processing descriptors, initialization PD 1403, top level loop PD 1405, and termination PD 1409. When a processing descriptor engine (PDE) process 1105(*i*) begins operation; it executes initialization PD 1403; it then executes top level loop 1405 until its operation is terminated; on termination, it executes termination process descriptor 1409. Initialization PD 1403 sets up the data structures and resources that are particular to PDE process 1105(*i*), including PDE process 11 05's local queue 2505 and timers. It also attaches PDE process 1105(*i*) to master queue 1501 and to the queues from which protocol messages are output to ECMR adapter 1009 and CCP adapter 10013. Operation of top level loop PD 1405 will be described in more detail below; termination process descriptor 1409 cleans up on termination of process 1105(*i*). Continuing to the next level of the hierarchy, message processing process descriptors 1411(0 . . . n) are the processing descriptors that deal with the messages received in MMA-PDE 1011 and error processing PDs 1413 are the processing descriptors that deal with errors that arise during execution of a message processing PD 1411 (*i*) or of top level loop PD 1405. Also included in message processing PDs 1411 are processing descriptors for handling timer expiration. Assignment processing descriptors 1417 do the processing involved in taking information obtained from a message for one of the signaling protocols and converting it into information of the proper form for the other signaling protocol and placing the information into the proper place in a message in the other protocol. Generic processing descriptors 1415 are processing descriptors that do processing that is common to several processing descriptors, which do the processing by invoking a generic processing descriptor 1415. Record definition processing descriptors describe the formats of the records that hold the information received from the messages while it is being processed.

Figure 15:
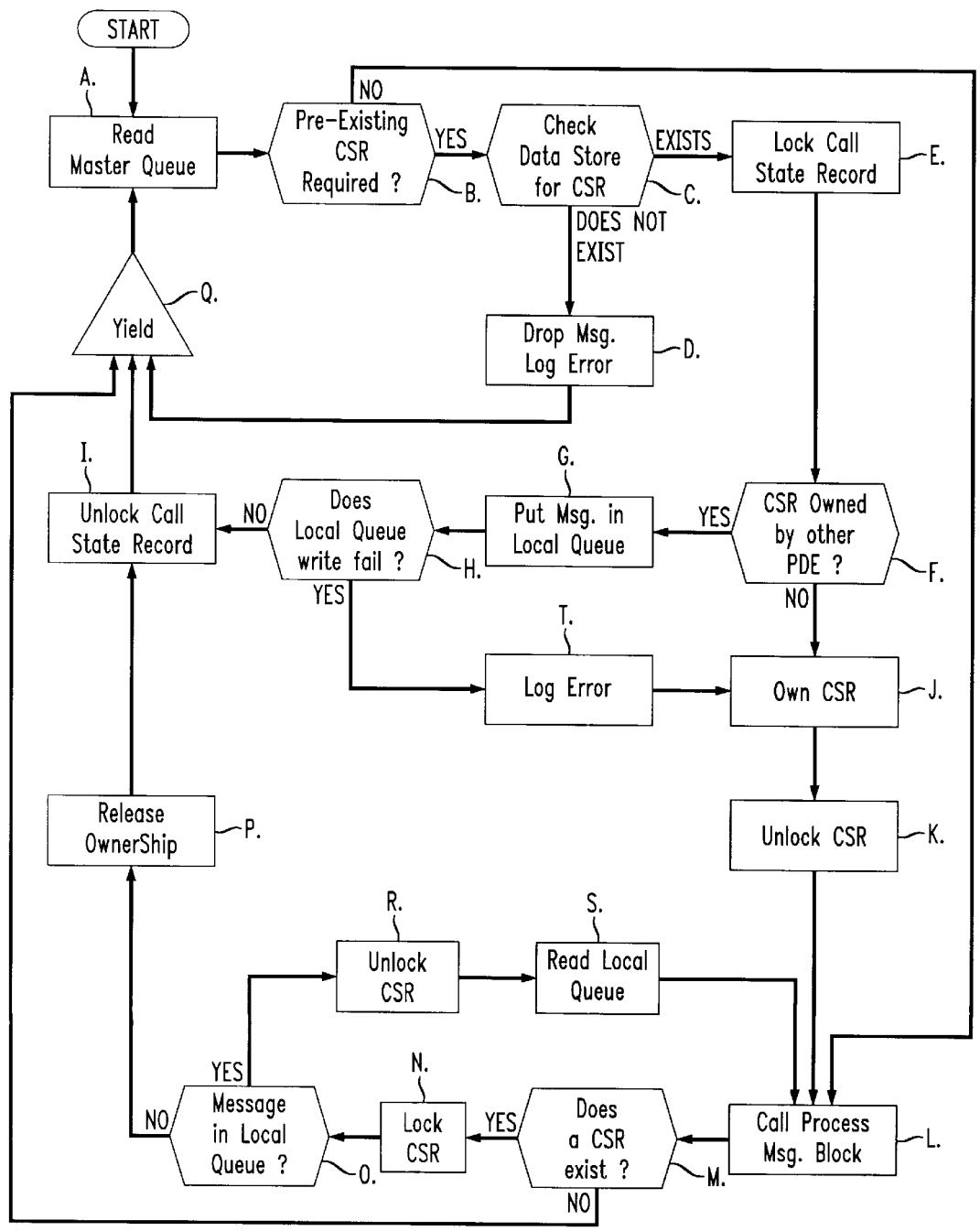
FIG. 15 is a flowchart of the operation of top-level loop PD 1405.

Details of Top-level Loop PD 1405: FIG. 15

FIG. 15 is a flowchart for top-level loop PD 1405. It is in general self-explanatory, given the foregoing description of MMA-PDE 1011. In summary, top-level loop PD 1405 reads a message from either the ABI or the IS-634 protocol from the head of master queue 2501 (step A). If the message concerns an existing call, there will be a CSR 607 in CSRs 609 for the call; PD 1405 locks the CSR 607 and determines from local queue handle 1305 whether the CSR 607 is already being used by another PDE 1105; if it is, PD 1405 puts the message in local queue 2505 for the PDE 1105 indicated by handle 1305 (steps F,G) and returns for another message. If the CSR 607 is not being used, the PDE 11 05 puts its local queue handle into field 1305 of the CSR 607, unlocks it, and calls the message processing PD 1411 required for the message (step L). On return from processing the message in step L, PD 1405 checks its local queue for a message (step Q); if there is one, PD 1405 reads the local queue (Step S) and processes the message in step L. Processing the messages in the local queue continues until there are none, and then PD 1405 releases its ownership of CSR 607 by removing its local queue handle 1305 from CSR 607 and unlocking it, so that it is accessible to the next PDE 1011 that handles a message for the call represented by CSR 607. Finally, PD 1405 reads another message from the head of master queue 2501.

Details of Message Processing for Mobile Call Termination: FIGS. 16–24

Figure 16:
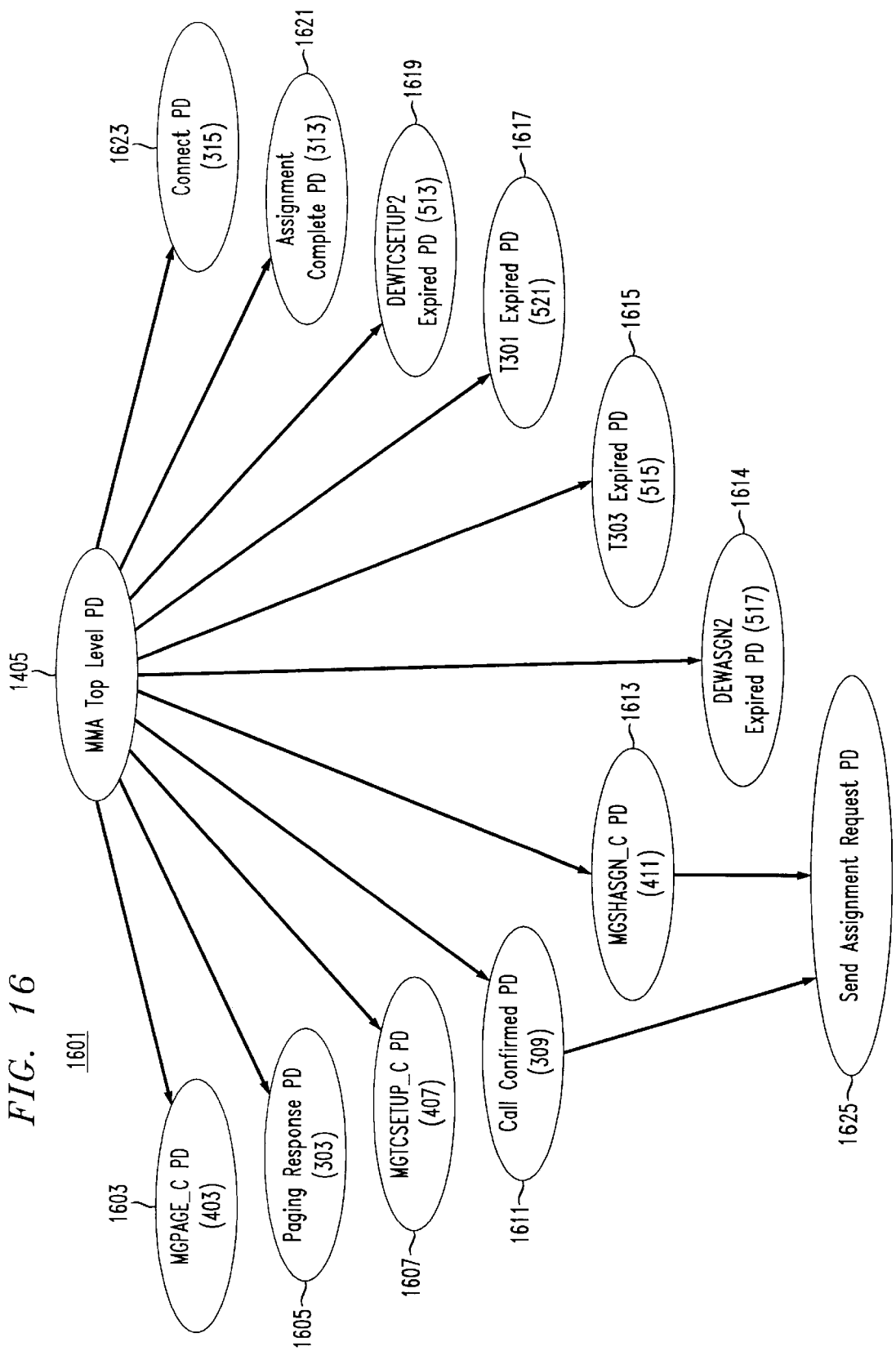
FIG. 16 is a calling diagram showing the PDs 1106 involved in call termination.

FIG. 16 is a calling diagram showing the processing descriptors 1106 (or more properly, the compiled processing descriptors 1108) that top-level processing descriptor calls when the call is being terminated at a mobile telephone. The order in which the processing descriptors are called is from left to right. In FIG. 16, processing descriptors 1603, 1605, 1607, 1611, 1613, 1621, and 1623 correspond to ABI or IS-634 protocol message. In each of these processing descriptors, the number in parentheses indicates the message in the message flow diagram of FIG. 5 that is processed by the processing descriptor. Thus, MGPAGE_C PD 1603 processes MGPAGE_C message 403 of FIG. 5. Processing descriptors 1614 through 1619 handle expiration of the timers DEWASGN2 517, T303 515, T301 521, and DEW-TCSETUP 2 513 of the message flow diagram of FIG. 5 Other timers that are not shown in FIG. 16 also have their own PDs. All of processing descriptors 1603 30 through 1623 are message processing PDs 1411. Send Assignment Request PD 1625 is a generic PD 1415 which is used whenever an assignment request message 311 is to be sent.

FIGS. 17 through 24 are flowcharts for PDs 1603, 1605, 607, 1611, 1613, 1621, 1623, and 1625. The flowcharts are in general self-explanatory.

Figure 17:
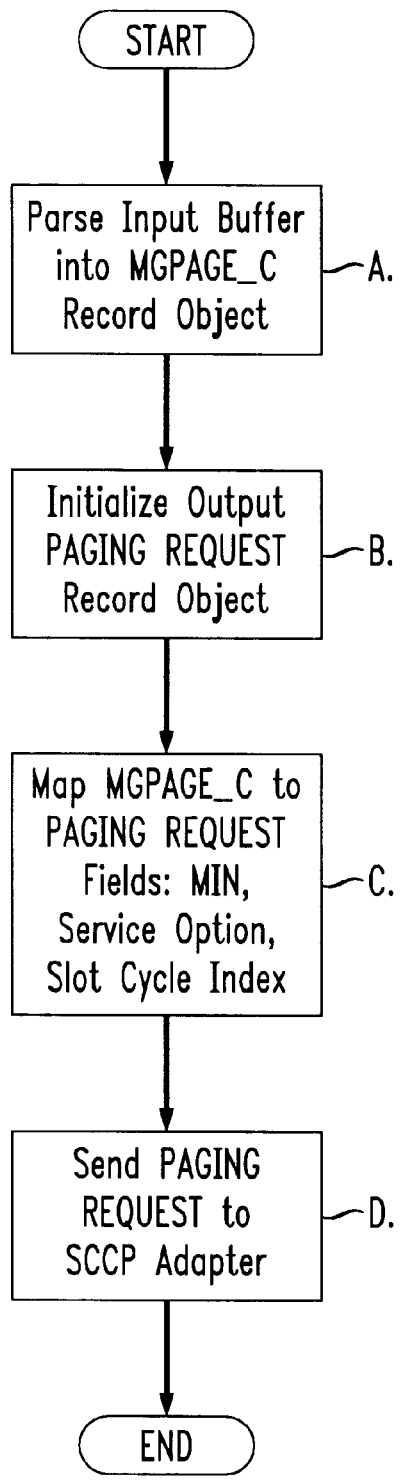
FIG. 17 is a flowchart for MGPAGE_C PD 1603.

FIG. 17, flowchart for MGPAGE_C PD 1603: This PD responds to ABI MGPAGE_C message 403. It puts the data from the message into an MGPAGE_C record object, maps the contents of that object to an object for PAGING REQUEST message 302, and sends that object to SCCP adapter 1013 to be used in sending message 302 to the BS(CC). It should be noted that this translation is a one-to-one mapping between messages with no timing constraints or order constraints, so the call's CSR 607 is not involved.

Figure 18:
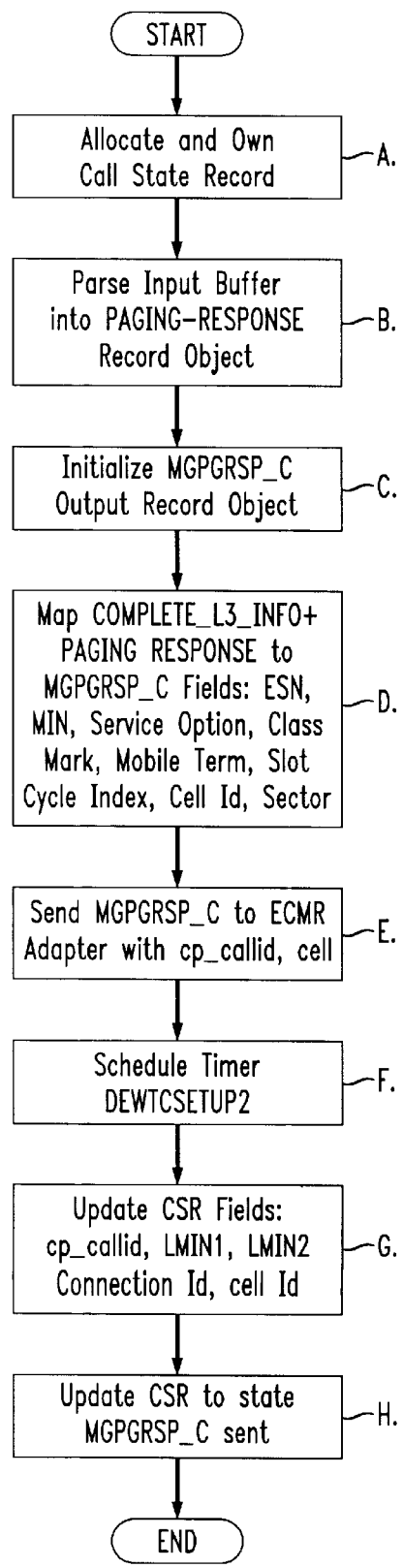
FIG. 18 is a flowchart for PAGING RESPONSE PD 1605.

FIG. 18, flowchart for PAGING RESPONSE PD 1605: This PD responds to IS-634 PAGING RESPONSE message 303. Here, some of the data in PAGING RESPONSE message 303 is used in the ABI MGPGRSP_C message 405 and some is required for later messages; the timer DEW-TCSETUP2 513 is also set; consequently, a CSR 607 is allocated for the call (step A). Then the contents of the PAGING RESPONSE message that are used in the ABI MGPGRSP_C message 405 are mapped to an object for that message (step D) and the message is sent (step E). Then timer 513 is set (step F), fields 1201, 1313, 1329, and 1203 of CSR 607 for the call are updated, and call status 611 is updated to indicate that ABI MGPRSP_C message 405 has been sent to the MSC.

Figure 19:
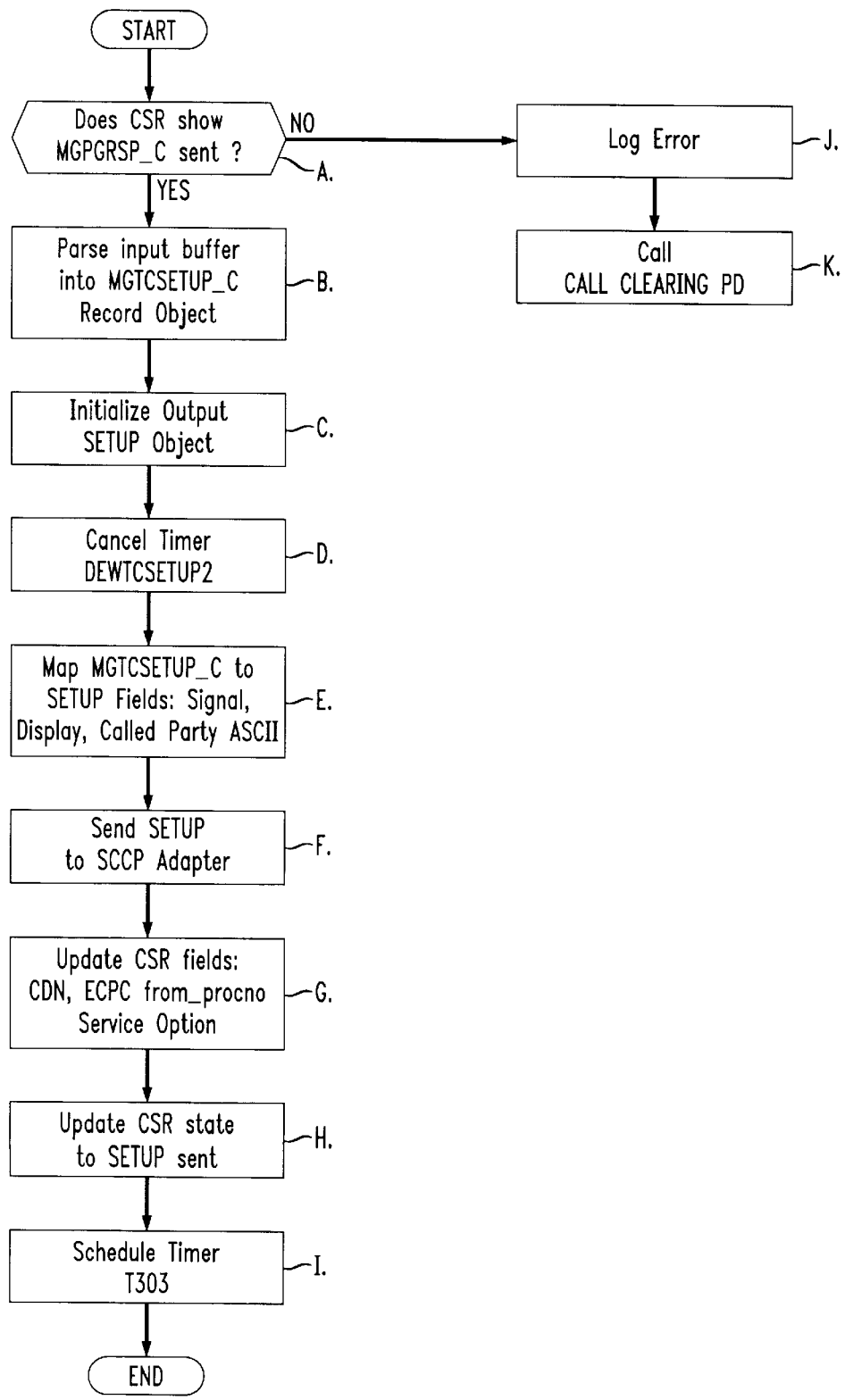
FIG. 19 is a flowchart for MGTCSETUP_C PD 1607.

FIG. 19, flowchart for MGTCSETUP_C PD 1607: This PD responds to ABI MGTCSETUP_C message 407 from the MSC. The first step is to check whether call status 611 in the CSR 607 for the call indicates that MGPRSP_C message 405 was sent. If it does not, an error has occurred and the call is cleared (steps J and K). If call status 611 indicates that message 405 was sent, PD 1607 obtains the information in the MGTCSETUP_C message, cancels timer DEWTCSETUP2 (step D), makes and sends IS-634 SETUP message 307, updates CSR 607 fields 1311, 1309, and 1331 from the information in the MGTCSETUP_C message, updates call state 611 to indicate that SETUP message 307 was the last message sent, and sets timer T303 515.

Figure 20:
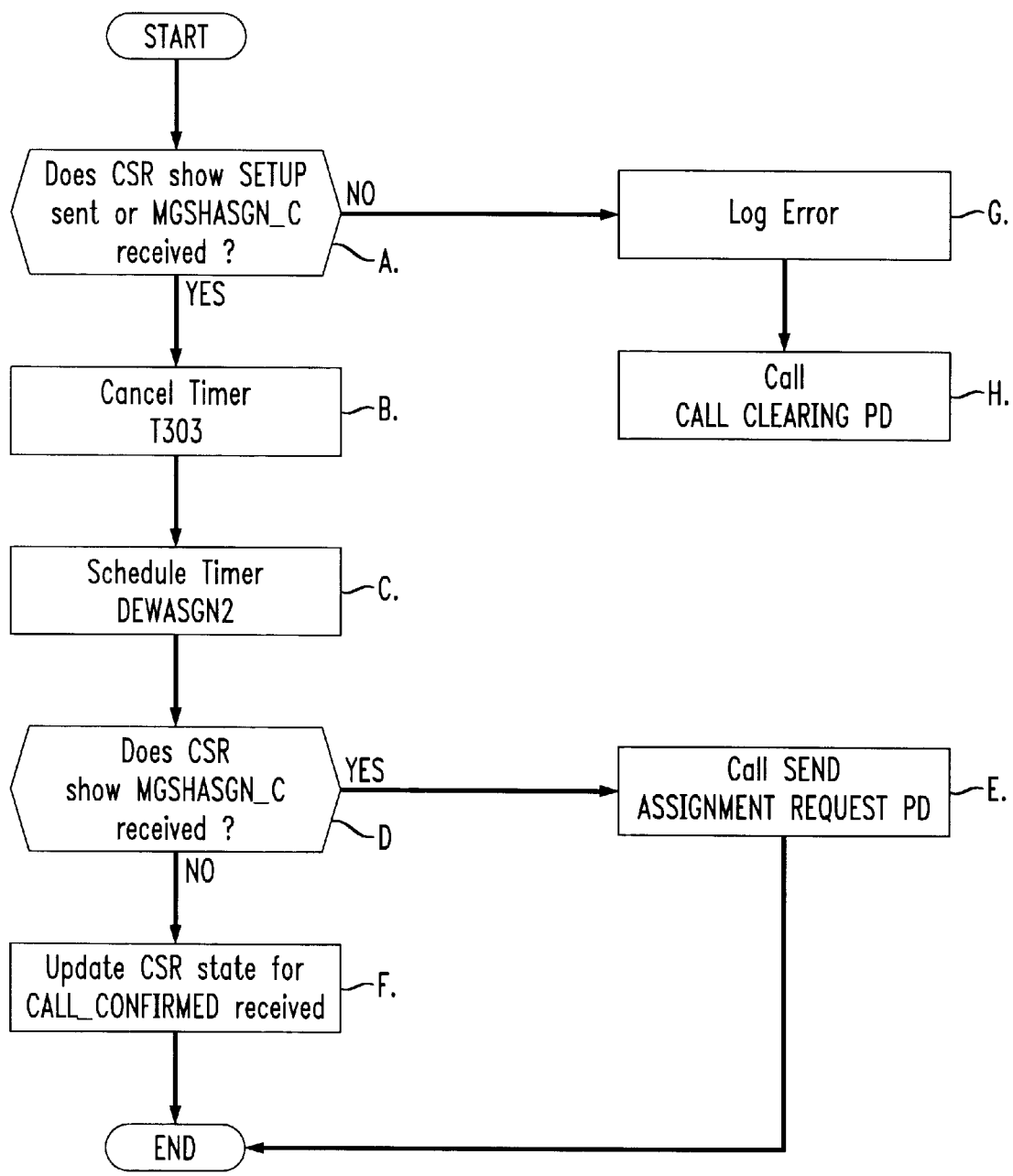
FIG. 20 is a flowchart for CALL_CONFIRMED PD 1611.

FIG. 20, flowchart for CALL_CONFIRMED PD 1611: This PD responds to IS-634 CALL_CONFIRMED message 309. This message must be received after SETUP message 307 is sent, but may be received either before or after ABI MGSHASGN_C message 411. On the other hand, IS-634 ASSIGNMENT REQUEST message 311 may be sent only after both CALL_CONFIRMED message 309 and MGSHASGN_C message 411 have been received. The call state information saved in CSR 607 makes it possible to deal with this kind of complex mapping problem. Thus, decision block A checks call status field 611 to determine whether either SETUP message 307 or MGSHASGN_C message 411 has been received; if neither has been, an error has occurred; next timer T303 is canceled and timer DEW-ASGN2 is set. At this point, if MGSHASGN_C message 411 has been received, SEND ASSIGNMENT REQUEST PD 1625 is called and PD 1625 sends IS-634 ASSIGNMENT REQUEST message 634 (steps D and E). If message 411 has not been received, CSR status 611 is updated to indicate that CALL_CONFIRMED message 309 has been received.

Figure 21:
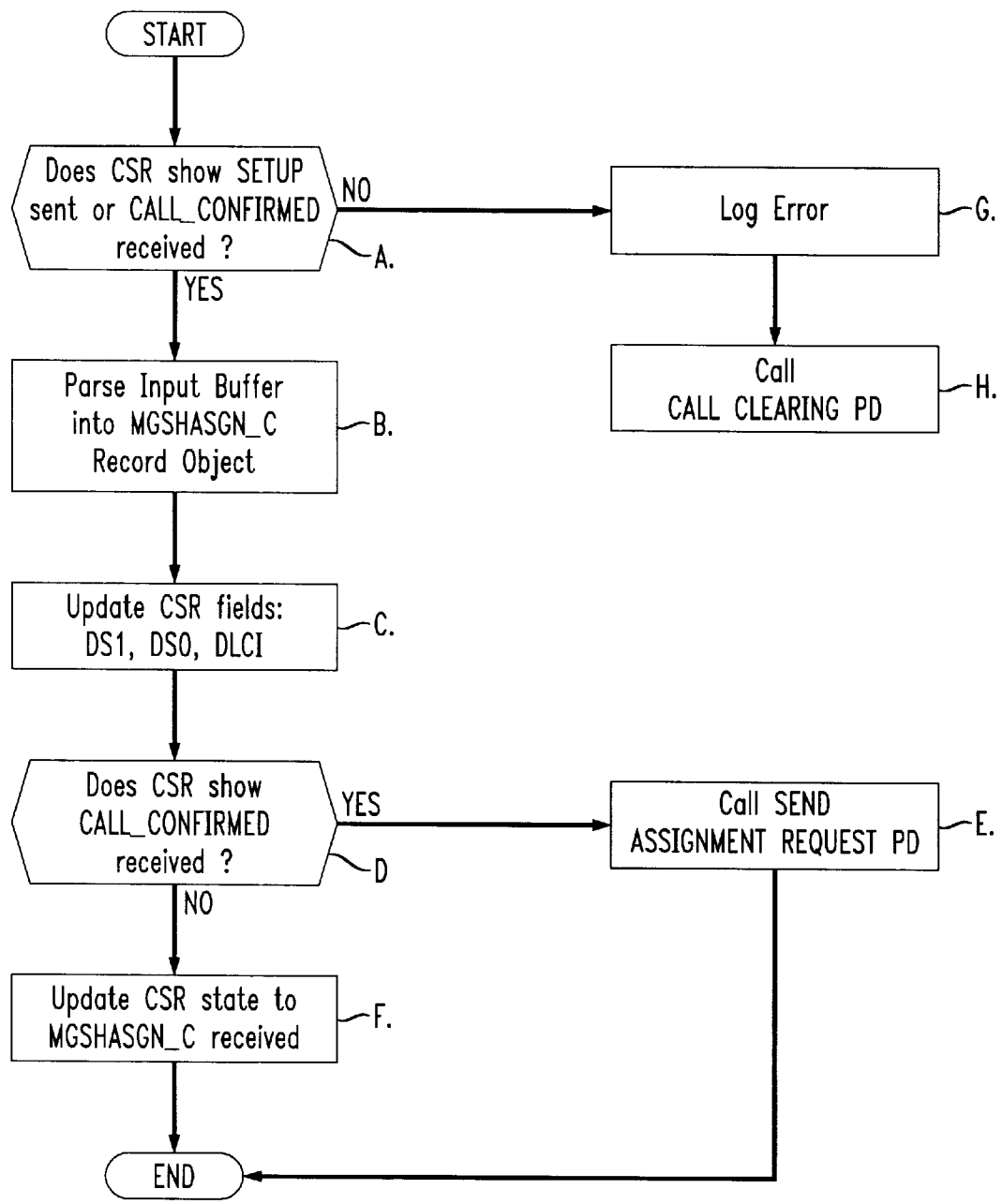
FIG. 21 is a flowchart for MGSHASGN_C PD 1613.

FIG. 21, flowchart for ABI MGSHASGN_C PD 1613 for ABI MGSHASGN_C message 411, deals with the ordering problems explained with regard to CALL_CONFIRMED PD 1611 in similar fashion; additionally, the data from MGSHASGN_C message 411 is used to update fields 1323, 1325, and 1315 in CSR 607. If SETUP message 307 has been sent and CALL_CONFIRMED message 309 has been received, send assignment request PD 1625 is invoked to send assignment request message 311. CSR status 611 is updated to indicate that MGSHASGN_C message 411 has been received.

Figure 22:
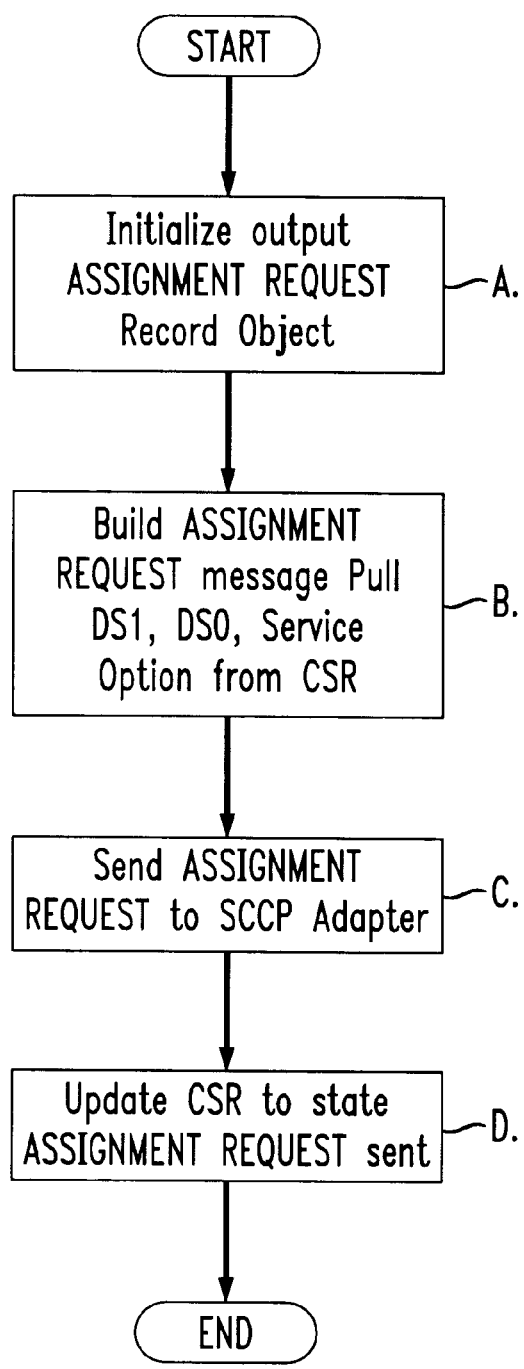
FIG. 22 is a flowchart for Send Assignment Request PD 1625.

FIG. 22, flowchart for Send Assignment Request PD 1625 for IS-634 Assignment Request message 311. This PD is invoked by either PD 1611 or PD 1613. Assignment Request PD 1625 simply makes and sends an assignment request message 311, with information in the message coming from fields 1323, 1325, and 1331 of CSR 607. When that is done, call status 611 is set to indicate that assignment request message 311 has been sent. Though not shown in the flowchart, PD 1625 also sets timer T10 519.

Figure 23:
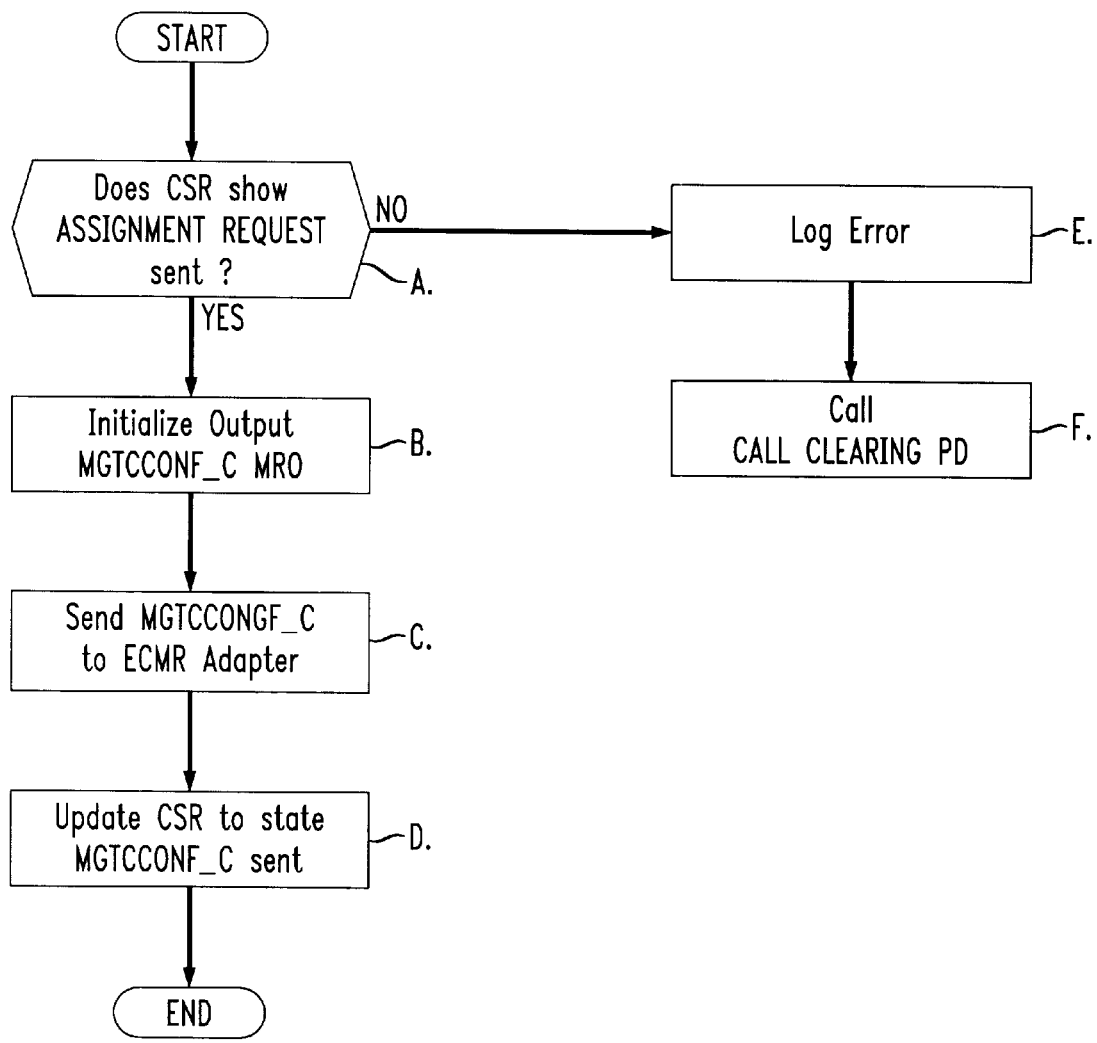
FIG. 23 is a flowchart for ASSIGNMENT_COMPLETE PD 1621.

FIG. 23, flowchart for ASSIGNMENT_COMPLETE PD 1621 for IS-634 ASSIGNMENT COMPLETE message 313. PD 1621 responds to an ASSIGNMENT_COMPLETE message 313 by first checking call status 611 in CSR 607 to make sure that the corresponding ASSIGMMENT REQUEST message 311 was sent. If it was, it sends an ABI MGTCONF_C message 413 and updates call status 611 to indicate that fact. Though not shown in the flowchart, PD 1621 also cancels timer T10 510 and sets timer T301 521.

Figure 24:
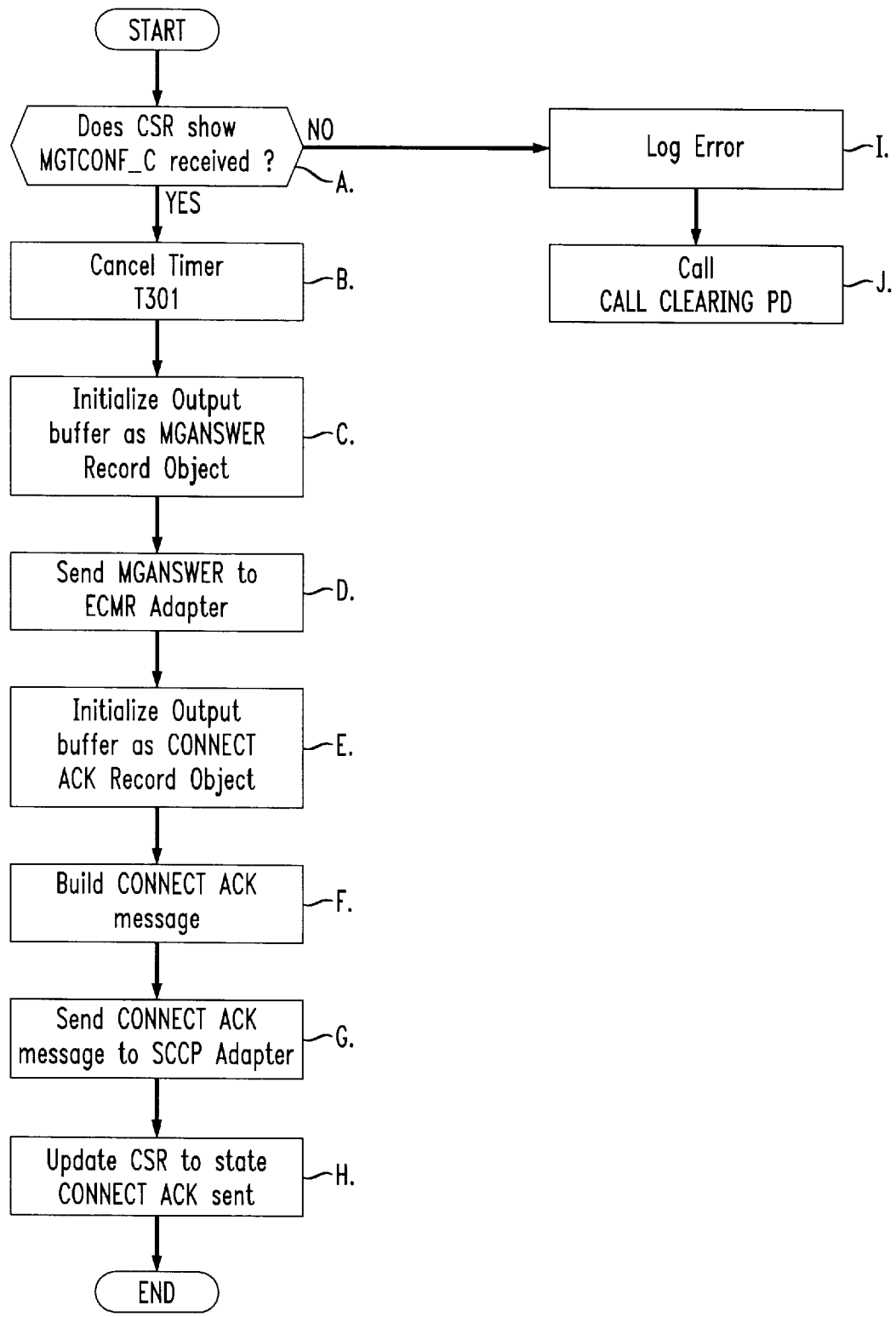
FIG. 24 is a flowchart for CONNECT PD 1623.

FIG. 24, flowchart for CONNECT PD 1623 for IS-634 CONNECT message 315. PD 1623 responds to a CONNECT message 315 by first checking CSR status 611 to determine whether a MGTCONF_C message 413 has been set. If it has been, it cancels timer T 301 525, sends an ABI MGANSWER message 415 to the MSC, sends an IS-634 CONNECT ACK message 317 to the BS(CC), and sets CSR status 611 to indicate that CONNECT ACK message 317 has been sent.

It will be immediately apparent to those skilled in the art from the foregoing disclosure of how the message translations involved in mobile termination are implemented. One can use the apparatus of MMA-PDE 1011 to implement the message translations involved in mobile originated as mobile origination is documented in the message flows of FIG. 7.

What is claimed is:
1. Apparatus for translating between an Autoplex base station interface mobile call termination sequence of signaling messages according to the Autoplex base station interface signaling protocol and an IS-634 mobile call termination sequence of signaling messages according to the IS-634 protocol, the apparatus comprising:
   call state information associated with the call for which mobile termination is being done, the call state information including
   call status information and
   signaling information; and
   a processor that receives a current signaling message belonging to one of the protocols and responds to the current signaling message and the call state information by producing a further signaling message belonging to one or the other of the protocols, the processor:

a) responding to an Autoplex base station interface MGPAGE_C message by making and sending an IS-634 PAGING_REQUEST message containing information from the MPAGE_C message;

b) responding to an I-634 COMPLETE_L3_INFO+ PAGING RESPONSE message received before an IS-634 timer T3113 expires by sending an IS-634 SCCP_Connection_Conf message and an ABI MPGGRSP_C message, the latter message including information form the COMPLETE_L3_INFO+ PAGING RESPONSE message and being received before an Autoplex base station interface CPPRT timer expires, storing signaling information from the COMPETE_L3_INFO+PAGING RESPONSE message in the signaling information, and altering the call state information;

c) responding to an Autoplex base station interface MGTCSETUP_C message that is permitted by the call state information and that is received before an Autoplex base station interface DEWTCSETUP2 timer expires by making and sending an IS-634 SETUP message containing information from the MGTCSETUP_C message, the SETUP message being received before an IS-634 T3230 timer expires, storing signaling information from the MGTCSETUP_C message, and altering the call state information;

d) responding to an IS-634 CALL_CONFIRMED message that is permitted by the call state information and that is received before an IS-634 T307 timer expires by, as permitted by the saved call status information, saving call status information required by a subsequent message and sending an IS-634 ASSIGNMENT REQUEST message containing saved signaling information;

e) responding to an Autoplex base station interface MGSHASGN_C message that is permitted by the call state information and that is received before an Autoplex base station interface timer DEWASGN2 expires by saving signaling information required by a subsequent message and, as permitted by the saved call status information, saving call status information required by a subsequent message and sending an IS-634 ASSIGNMENT REQUEST message containing saved signaling information, the ASSIGNMENT REQUEST message being received before an IS-634 timer T303 expires;

f) responding to an IS-634 ASSIGNMENT_COMPLETE message that is permitted by the call status information and that is received before an IS-634 T10 timer expires by sending an Autoplex base station interface MGTCCONF_C message which is received before an Autoplex base station interface CPTCCONF timer expires and saving call status information as required for a subsequent message; and g) responding to an IS-634 CONNECT message that is permitted by the call status information by sending an Autoplex base station interface MGANSWER message, the MGANSWER message being received before an Autoplex base station interface CPCSAT timer expires, and an IS-634 CONNECT ACK message which is received before an IS-634 T313 timer expires, and saving call status information as required for a subsequent message.

2. Apparatus for translating between an Autoplex base station interface mobile call origination sequence of signaling messages according to the Autoplex base station interface signaling protocol and an IS-634 mobile call origination sequence of signaling messages according to the IS-634 protocol, the apparatus comprising:

call state information associated with the call for which mobile termination is being done, the call state information including
call status information and
signaling information; and a processor that receives a current signaling message belonging to one of the protocols and responds to the current signaling message and the call state information by producing a further signaling message belonging to one or the other of the protocols, the processor:

a) responding to an IS-634 CM_SVC_REQ message by producing an IS-634 SCCP_CONNECTION_CONF message which is received before an IS-634 T-3230 timer expires and saving call status information and signaling information required by a subsequent message, b) responding to an IS-634 SETUP message that is permitted by the call status information and that is received before an IS-634 T302 timer expires by sending an Autoplex base station interface MGORIG_C message containing saved signaling information and saving call status information required by a subsequent message, c) responding to an Autoplex base station interface MGTCSETUP_C message that is permitted by the saved call status information and that is received before an Autoplex base station interface timer DEWTC-SETUP1 expires by saving call status information required by a subsequent message and sending an IS-634 CALL_PROCEEDING message, d) responding to an Autoplex base station interface MGSHASGN_C message that is permitted by the saved call status information and that is received before an Autoplex base station interface timer DEWASGN1 expires by saving call status information and signaling information required by a subsequent message and sending an IS-634 ASSIGNMENT REQUEST message containing saved signaling information, the ASSIGNMENT REQUEST message arriving before an IS-634 T303 timer expires; and e) responding to an IS-634 ASSIGNMENT_COMPLETE message that is permitted by the saved call status information and that is received before an IS-634 T10 timer expires by sending an Autoplex base station interface MGTCCONF_C message that is received before an Autoplex base station interface CPTCCONF timer expires and saving call status information as required for a subsequent message.

* * * * *